United States Patent
Liu et al.

(10) Patent No.: US 11,409,438 B2
(45) Date of Patent: Aug. 9, 2022

(54) PERIPHERAL CIRCUIT AND SYSTEM SUPPORTING RRAM-BASED NEURAL NETWORK TRAINING

(71) Applicant: Huawei Technologies Co., Ltd., Shenzhen (CN)

(72) Inventors: Wulong Liu, Beijing (CN); Jun Yao, London (GB); Yu Wang, Beijing (CN); Ming Cheng, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 546 days.

(21) Appl. No.: 16/545,932

(22) Filed: Aug. 20, 2019

(65) Prior Publication Data

US 2019/0369873 A1 Dec. 5, 2019

Related U.S. Application Data

(63) Continuation of application No. PCT/CN2018/090541, filed on Jun. 11, 2018.

(30) Foreign Application Priority Data

Jun. 16, 2017 (CN) .......................... 201710459633.2

(51) Int. Cl.
*G06F 3/06* (2006.01)
*G06F 13/12* (2006.01)
(Continued)

(52) U.S. Cl.
CPC ............ *G06F 3/061* (2013.01); *G06F 3/0629* (2013.01); *G06F 3/0673* (2013.01); *G06F 13/12* (2013.01); *G06N 3/08* (2013.01)

(58) Field of Classification Search
CPC ................................... G06N 3/08; G06N 3/04
See application file for complete search history.

(56) References Cited

U.S. PATENT DOCUMENTS 5,852,574 A  12/1998 Naji
9,646,243 B1  5/2017 Gokmen
(Continued)

FOREIGN PATENT DOCUMENTS

CN  103778468 A  5/2014
CN  104376362 A  2/2015
(Continued)

OTHER PUBLICATIONS

Li Chuxi, et al., "A Memristor-Based Processing-in-Memory Architecture for Deep Convolutional Neural Networks Approximate Computation," Journal of Computer Research and Development, 2017, Issue 06, 14 pages.
(Continued)

*Primary Examiner* — Getente A Yimer
(74) *Attorney, Agent, or Firm* — Conley Rose, P.C.

(57) ABSTRACT

A peripheral circuit includes a data preparation circuit, configured to selectively import, to a row or column of the resistive random access memory (RRAM) crossbar array based on a first control signal, preprocessed data obtained by first preprocessing on first data that is input into the data preparation circuit, a data selection circuit, configured to selectively export second data from the row or column of the RRAM crossbar array based on a second control signal, and perform second preprocessing on the second data to obtain third data, a data reading circuit, configured to: perform a weight update control operation, and perform a max pooling operation on fourth data that is input into the data reading circuit, to obtain fifth data, and a reverse training computation circuit, configured to calculate an error and a derivative of sixth data that is input into the reverse training computation circuit.

20 Claims, 15 Drawing Sheets

(51) Int. Cl.
*G06N 3/08* (2006.01)
*G06N 3/00* (2006.01)
*G06N 3/04* (2006.01)
*G06N 3/063* (2006.01)

(56) References Cited

U.S. PATENT DOCUMENTS

| | | | |
|---|---|---|---|
| 2008/0254291 A1* | 10/2008 | Dehon | B82Y 10/00 |
| | | | 216/101 |
| 2012/0061648 A1* | 3/2012 | Dehon | H01L 29/0669 |
| | | | 257/15 |
| 2017/0091616 A1 | 3/2017 | Gokmen et al. | |
| 2017/0109626 A1* | 4/2017 | Gokmen | G06N 3/0472 |
| 2018/0309451 A1* | 10/2018 | Lu | H04Q 3/0004 |
| 2020/0117699 A1* | 4/2020 | Kim | G06N 3/084 |

FOREIGN PATENT DOCUMENTS

| | | |
|---|---|---|
| CN | 105740946 A | 7/2016 |
| CN | 105976022 A | 9/2016 |
| CN | 106530210 A | 3/2017 |
| CN | 106847335 A | 6/2017 |

OTHER PUBLICATIONS

Gedeon, T.D., "Stochastic bidirectional training," XP010310953, Oct. 11, 1998, pp. 1968-1971.
Nagi, J., et al. "Max-Pooling Convolutional Neural Networks for Vision-based Hand Gesture Recognition," IEEE International Conference on Signal and Image Processing Applications (ICSIPA2011), XP032106944, Nov. 16, 2011, pp. 342-347.
Machine Translation and Abstract of Chinese Publication No. CN105740946, Jul. 6, 2016, 49 pages.
Machine Translation and Abstract of Chinese Publication No. CN105976022, Sep. 28, 2016, 25 pages.
Machine Translation and Abstract of Chinese Publication No. CN106530210, Mar. 22, 2017, 16 pages.
Machine Translation and Abstract of Chinese Publication No. CN106847335, Jun. 13, 2017, 19 pages.
Chi, P., et al., "PRIME: A Novel Processing-in-memory Architecture for Neural Network Computation in ReRAM-based Main Memory," ACM/IEEE 43rd Annual International Symposium on Computer Architecture, 2016, pp. 27-39.
Tang, T., et al., "Binary Convolutional Neural Network on RRAM," IEEE, 2017, pp. 782-787.
Foreign Communication From A Counterpart Application, PCT Application No. PCT/CN2018/090541, English Translation of International Search Report dated Sep. 19, 2018, 2 pages.

* cited by examiner

PERIPHERAL CIRCUIT AND SYSTEM SUPPORTING RRAM-BASED NEURAL NETWORK TRAINING

CROSS-REFERENCE TO RELATED APPLICATIONS

This application is a continuation of International Application No. PCT/CN2018/090541, filed on Jun. 11, 2018, which claims priority to Chinese Patent Application No. 201710459633.2, filed on Jun. 16, 2017. The disclosures of the aforementioned applications are hereby incorporated by reference in their entireties.

TECHNICAL FIELD

The present disclosure relates to the field of neural network training, and in particular, to a peripheral circuit configured to support RRAM-based neural network training.

BACKGROUND

In recent years, neural networks, especially deep neural networks, have been widely applied in fields such as computer vision, voice recognition, and intelligent control. Computation in deep neural network training has two typical characteristics, memory-intensive and computation-intensive. For the memory-intensive characteristic, first, neural network training usually needs to rely on massive training data, for example, there are 14 million pictures in IMAGENET 2012, second, the deep neural network includes hundreds of millions of connection parameters of neurons, and especially requires frequent updates during a training process, third, during a computation process, the deep neural network generates a large quantity of intermediate results, for example, gradient information. Access overheads of a large quantity of data such as training data, connection weights, and intermediate results pose an urgent requirement on a data storage structure and computation performance optimization. For the computation-intensive characteristic, a typical operation of the deep neural network is multidimensional matrix multiplication (operation complexity is $O(N^3)$) and graphics optimization. For example, the 22-layer GOOGLENET network needs 6G FLOPS. Therefore, a relatively high requirement has been posed on computer hardware and performance optimization.

A resistive random access memory (RRAM) is considered as one of devices for improving computation energy efficiency of a neural network. First, integration density of the RRAM is very high, second, the RRAM is a non-volatile memory and can implement convergence of storage and computation, thereby greatly reducing access overheads, third, with a resistance variable characteristic, an RRAM storage unit can represent a plurality of values instead of only two values of a conventional storage unit, 0 and 1. Based on the foregoing characteristics of the RRAM, a crossbar array structure is set up using the RRAM, as shown in FIG. 1, and can be well adapted to a matrix vector multiplication operation in the neural network. Existing work shows that, the crossbar array structure that is set up using the RRAM storage unit accelerates neural network computation, and can improve energy efficiency by 100 times to 1000 times compared with a central processing unit (CPU) or a graphics processing unit (GPU).

However, advantages of the RRAM are not fully explored in the existing work. An RRAM crossbar array in the prior art can be used only to accelerate forward computation of the neural network, but cannot be used to accelerate a neural network training process with a higher computation requirement. The neural network training mainly includes three steps, forward computation, backpropagation, and weight update. There is no peripheral circuit supporting corresponding computation in the prior art.

Therefore, a peripheral circuit is needed to support RRAM-based neural network training to improve energy efficiency in neural network training.

SUMMARY

For problems existing in the prior art, this application provides a peripheral circuit configured to support RRAM crossbar array-based neural network training, to support the RRAM crossbar array-based neural network training using the peripheral circuit to accelerate neural network computation.

According to a first aspect, this application provides a peripheral circuit, configured to support resistive random access memory RRAM crossbar array-based neural network training, including, a data preparation circuit, configured to perform first preprocessing on first data that is input into the data preparation circuit, and selectively import, to a row or column of the RRAM crossbar array based on a first control signal, preprocessed data obtained by the first preprocessing, where the first data includes sample data used for the neural network training, a data selection circuit, configured to selectively export second data from the row or column of the RRAM crossbar array based on a second control signal, and perform second preprocessing on the second data to obtain third data, where the second data is data obtained by performing computation on the preprocessed data in the RRAM crossbar array, there is a correspondence between the first control signal and the second control signal, and the correspondence is used to indicate the following, that the data preparation circuit imports, based on the first control signal, the preprocessed data obtained by the first preprocessing on the first data to the row of the RRAM crossbar array corresponds to that the data selection circuit exports the second data from the column of the RRAM crossbar array based on the second control signal, and that the data preparation circuit imports, based on the first control signal, the preprocessed data obtained by the first preprocessing on the first data to the column of the RRAM crossbar array corresponds to that the data selection circuit exports the second data from the row of the RRAM crossbar array based on the second control signal, a data reading circuit, configured to perform a weight update control operation, and perform a max pooling operation on fourth data that is input into the data reading circuit, to obtain fifth data, where the fourth data includes the third data, and a reverse training computation circuit, configured to calculate an error and a derivative of sixth data that is input into the reverse training computation circuit, where the sixth data includes the fifth data.

Further, the peripheral circuit further includes a storage medium, configured to store the sample data and data that is stored into the storage medium by at least one of the data preparation circuit, the data selection circuit, the data reading circuit, and the reverse training computation circuit. Optionally, the storage medium includes a buffer register unit and a sample data storage unit, the sample data storage unit is configured to store the sample data, the buffer register unit is configured to store the data stored into the buffer register unit by at least one of the data preparation circuit, the data selection circuit, the data reading circuit, and the reverse training computation circuit, and the data preparation circuit, the data selection circuit, the data reading circuit, and the reverse training computation circuit all read data from or write data to the buffer register unit using high data bandwidth. The buffer register unit exchanges data with each circuit of the peripheral circuit using high data bandwidth (high bandwidth). The concept of high bandwidth is a general understanding in the technical field, or may change as technologies develop. This is not specifically limited herein. Therefore, various data generated in a neural network training process may be temporarily stored in the buffer register unit. This can improve efficiency in reading or writing computation data. Optionally, the buffer register unit may be a storage unit independent of a storage circuit.

The peripheral circuit can support computation of three steps of the RRAM crossbar array-based neural network training, forward computation, backward propagation, and weight update, to accelerate the neural network training.

In a first possible implementation of the first aspect, the data preparation circuit includes a wordline driver and decoder WDD and two first transmission gates TG, the WDD is configured to receive the first data, and perform the first preprocessing on the first data to obtain the preprocessed data, the two first TGs are connected in parallel, and are connected to an output port of the WDD, and the two first TGs include a first row TG and a first column TG, and the first row TG and the first column TG are not switched on at a same time, where the first row TG is configured to, based on the first control signal, establish continuity in a path connecting the WDD to each row of the RRAM crossbar array, and import, to each row of the RRAM crossbar array, the preprocessed data output by the WDD, and the first column TG is configured to, based on the control signal, establish continuity in a path connecting the WDD to each column of the RRAM crossbar array, and import, to each column of the RRAM crossbar array, the preprocessed data output by the WDD.

Two transmission gates are disposed between the WDD and the RRAM crossbar array. According to an embodiment, different transmission gates are controlled to be switched on or off based on a control signal such that continuity of the path between the WDD and each row of the RRAM crossbar array or the path between the WDD and each column of the RRAM crossbar array can be selectively established, and corresponding data exchange is performed after continuity of the path is established. According to design of such transmission gates, the WDD and another unit in the data preparation circuit may be reused without increasing circuit complexity, to import data into the row or column of the RRAM crossbar array. Optionally, a single-pole double-throw switch circuit may be disposed between the WDD and the RRAM crossbar array to replace the foregoing two transmission gates, or another similar circuit that can achieve a same purpose may be disposed.

In another possible implementation of the first aspect, the data selection circuit includes a preprocessing circuit, a multi-path selector, and two second TGs, the two second TGs are connected in parallel, and are connected to an input port of the multi-path selector, the second TGs include a second row TG and a second column TG, and the second row TG and the second column TG are not switched on at a same time, where the second row TG is configured to establish, based on the second control signal, continuity in a path connecting the multi-path selector to each row of the RRAM crossbar array, and the second column TG is configured to establish, based on the second control signal, continuity in a path connecting the multi-path selector to each column of the RRAM crossbar array, the multi-path selector is configured to export the second data from the RRAM crossbar array along the paths switched on by the two second TGs, and the preprocessing circuit is configured to perform the second preprocessing on the second data exported by the multi-path selector, to obtain the third data, and store the third data into the buffer register unit.

Two transmission gates are disposed between the multi-path selector and the RRAM crossbar array. According to an embodiment, different transmission gates are controlled to be switched on or off based on a control signal such that continuity of the path between the multi-path selector and each row of the RRAM crossbar array or the path between the multi-path selector and each column of the RRAM crossbar array can be selectively established, and corresponding data exchange is performed after continuity of the path is established. According to design of such transmission gates, the multi-path selector, the preprocessing circuit, and another unit in the data reading circuit may be reused without increasing circuit complexity, to export, from a row or column of the RRAM crossbar array, a result obtained through computation in the RRAM crossbar array. Optionally, a single-pole double-throw switch is disposed between the multi-path selector and the RRAM crossbar array to replace the foregoing two transmission gates, or another similar circuit that can achieve a same purpose may be disposed.

In still another possible implementation of the first aspect, the data reading circuit includes a sense amplifier circuit and a max pooling operation circuit, the sense amplifier circuit is configured to read the fourth data from the buffer register unit or the data selection circuit, the max pooling operation circuit is configured to perform the max pooling operation on the fourth data read by the sense amplifier circuit, to obtain the fifth data, and store the fifth data into the buffer register unit, where the fifth data is a value obtained after forward computation, and the max pooling operation circuit includes at least one first register, where an input port of each of the at least one first register is connected to a first selector, and the first selector is configured to, based on a third control signal, selectively read 0, or read, from the buffer register unit, an operand of a max pooling operation to be performed, and input the operand into the corresponding first register.

A single-pole double-throw selector is connected to an input port of each register, and different data can be selectively input into the register by controlling the single-pole double-throw selector. When a single-pole double-throw selector reads 0, it means that a corresponding register does not participate in the max pooling operation. In other words, there is no register, into which 0 is input, in the max pooling operation circuit. A quantity of registers is controlled using the single-pole double-throw selector, to meet computation of data on which max pooling operations whose operands have bits of different quantities are to be performed. Optionally, the max pooling operation circuit further includes four second registers, and the second register is configured to indicate a register that is not connected to a selector, and read, from the buffer register unit, the operand of the max pooling operation to be performed. Usually, an operand of computation of a max pooling operation that needs to be performed has four bits. In other words, usually, at least four registers are configured to read data on which a max pooling operation is to be performed, thereby reducing a quantity of unnecessary selectors and corresponding costs.

In yet another possible implementation of the first aspect, the reverse training computation circuit includes an error calculation circuit and a derivative calculation circuit, the error calculation circuit is configured to calculate an error based on the sixth data read from the data reading circuit or the buffer register unit, and store the calculated error into the buffer register unit, the derivative calculation circuit is configured to calculate a derivative of a nonlinear function of the sixth data read from the data reading circuit or the buffer register unit, and store the calculated derivative into the buffer register unit, and the sixth data includes a value obtained after forward computation. The reverse training computation circuit can support the RRAM crossbar array-based neural network training, to implement two important computations, derivative calculation and error calculation. Optionally, the nonlinear function includes a ReLU function and a sigmoid function.

In still yet another possible implementation of the first aspect, the derivative calculation circuit includes a second selector, a third selector, a comparator, a first subtractor, and a multiplier, an output port of the second selector is connected to an input port of the first subtractor, an output port of the first subtractor is connected to an input port of the multiplier, an output port of the multiplier is connected to a first input port of the third selector, an output port of the comparator is connected to a second input port of the third selector, the second selector is configured to read, from the data reading circuit or the buffer register unit, the value obtained after forward computation, the first subtractor is configured to subtract, from 1, the value that is obtained after forward computation and that is input by the second selector, to obtain a first difference, the multiplier is configured to multiply the input first difference to obtain a first product, the comparator is configured to perform a comparison operation on the value that is obtained after forward computation and that is input by the data reading circuit, to obtain a comparison result, and the third selector is configured to, based on a fourth control signal, selectively select the comparison result from the comparator or select the first product from the multiplier, and store the comparison result or the first product as a derivative into the buffer register unit.

A typical nonlinear function used in the neural network training mainly includes the Rectified Linear Units (ReLU) function and the sigmoid function. The result output after the comparator performs the comparison operation is a derivative calculation result of the ReLU function, and the result output by the multiplier after the subtractor and the multiplier perform the corresponding operations is a derivative calculation result of the sigmoid function. The third selector is controlled to choose to output a derivative for a ReLU function or for a sigmoid function to meet two main derivative calculations in the RRAM crossbar array-based neural network training. Optionally, the derivative calculation circuit may also be applied to derivative calculation in another neural network that is not based on an RRAM crossbar array.

In a further possible implementation of the first aspect, the error calculation circuit includes a fourth selector, an adder, and a second subtractor, an output port of the fourth selector is connected to an input port of the adder, an output port of the adder is connected to an input port of the second subtractor, and the fourth selector is configured to, based on a fifth control signal, selectively read 0 or a weight r 1, and input read 0 or r into the adder, the adder is configured to read seventh data from the data reading circuit or the buffer register unit, and add up data input by the fourth selector and the read seventh data, to obtain a first sum, and the second subtractor is configured to read eighth data from the data reading circuit or the buffer register unit, and subtract the eighth data from the first sum input by the adder, to obtain an error.

The fourth selector selects different data based on different control signals, thereby meeting error calculations in two types of RRAM crossbar array-based neural network training, supervised learning neural network training and spiking learning neural network training. Optionally, the error calculation circuit may also be applied to derivative calculation in another neural network that is not based on an RRAM crossbar array.

Optionally, the neural network training is supervised learning neural network training, the fourth selector is configured to, based on the fifth control signal, read 0, and input read 0 into the adder, the adder is configured to read, from the buffer register unit, a truth value y* corresponding to the sample data, add up the truth value y* corresponding to the sample data and 0 input by the fourth selector, to obtain the first sum, and input the first sum into the second subtractor, and the second subtractor is configured to read, from the data reading circuit or the buffer register unit, a value f(x) obtained after forward computation, and subtract, from the value f(x) obtained after forward computation, the first sum input by the adder, to obtain an error.

Optionally, the neural network training is deep spiking learning neural network training, the fourth selector is configured to, based on the fifth control signal, read r, and input read r into the adder, the adder is configured to read, from the data reading circuit or the buffer register unit, a value $\gamma \max_a Q'(s', a'; W_B)$ obtained after forward computation, add up the value $\gamma \max_a Q'(s', a'; W_B^*)$ obtained after forward computation and r, to obtain the first sum, and input the first sum to the second subtractor, and the second subtractor is configured to read $Q(s, a; W_A)$ from the data reading circuit or the buffer register unit, and subtract, from $Q(s, a; W_A)$, the first sum input by the adder, to obtain an error.

In a still further possible implementation of the first aspect, the data reading circuit further includes a weight update control circuit, the weight update control circuit is configured to determine whether a weight is a positive or negative value, and output a first RESET signal or a second RESET signal according to a determining result, the weight is represented by a first weight W+ and a second weight W−, both the first weight W+ and a second weight W− are positive values, the first RESET signal is used to indicate that the weight is a positive value, the second RESET signal is used to indicate that the weight is a negative value, the first RESET signal is used to control a corresponding node of the RRAM crossbar array storing the second weight w− to perform a RESET operation, the second RESET signal is used to control a corresponding node of the RRAM crossbar array storing the first weight W+to perform the RESET operation, and the RESET operation is used to indicate adjustment from low resistance to high resistance. Neural network training has a characteristic of intensive access. When an RRAM is used for the neural network training, reliability of the RRAM is greatly lowered due to frequent write operations, especially SET operations on the RRAM, namely, adjustment from high resistance to low resistance. The weight update control circuit determines whether the weight is a positive or negative value, and uses the result as a control signal to control a switch that is connected to the RRAM crossbar array storing W− or W+to perform a RESET operation on the RRAM crossbar array, rather than a SET operation on the RRAM to improve reliability of the RRAM in the neural network training.

This application provides the peripheral circuit configured to support RRAM crossbar array-based neural network training, to support the RRAM crossbar array-based neural network training using the peripheral circuit to accelerate neural network computation.

According to a second aspect, this application provides a neural network training system, and the system includes a control circuit, a resistive random access memory RRAM crossbar array, and the peripheral circuit described in any one of the foregoing possible implementations of the first aspect. The control circuit is configured to generate a plurality of control signals, and the plurality of control signals include at least the first control signal, the second control signal, the third control signal, the fourth control signal, and the fifth control signal.

The neural network training system provided in this application can accelerate neural network training, and can improve computation in the neural network training by at least 5.7 times compared with a CPU or a GPU.

DESCRIPTION OF EMBODIMENTS

The following describes the technical solutions of the embodiments in this application with reference to accompanying drawings.

Figure 1:
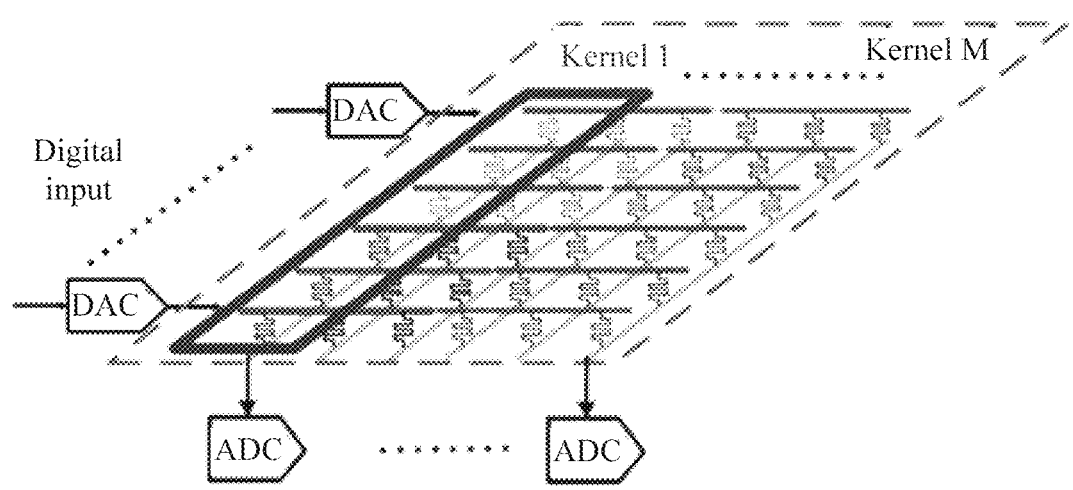
FIG. 1 is a schematic structural diagram of an RRAM crossbar array according to this application.
Figure 2:
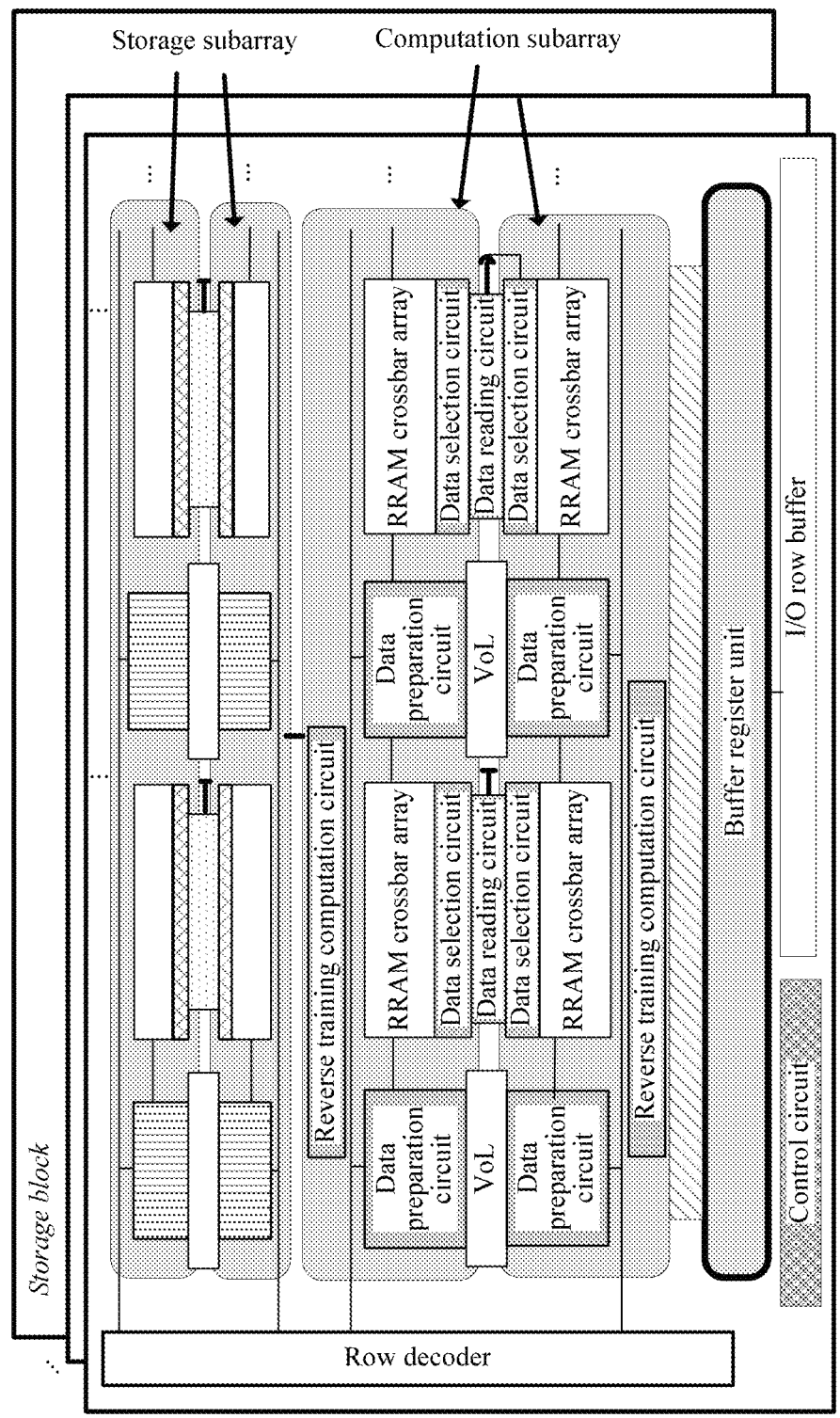
FIG. 2 is a schematic structural diagram of a neural network training system according to an embodiment of this application.

A peripheral circuit provided in this application can be applied to RRAM crossbar array (crossbar)-based neural network training, and may also be applied to neural network training that is based on another device with performance similar to that of an RRAM, to support computation of three main steps of the neural network training, forward computation, backpropagation, and weight update. The peripheral circuit may be applied only to computation of one or more of the steps, forward computation, backpropagation, and weight update. The neural network training is not limited to supervised learning neural network training and deep spiking learning neural network training, and may also be applied to other neural network training or newly emerged neural network training. FIG. 2 is a schematic diagram of a system architecture in a possible application scenario according to this application. A storage medium (Memory Subarray, Mem Subarray) communicates with a function circuit (Full function Subarray (FF Subarray)) such that the function circuit stores data into or read data from the storage medium. The storage medium may be a non-volatile storage medium in any form, and this is not limited herein. A buffer register unit may be a part of the storage medium, or may be a separate storage medium. When the buffer register unit is a separate storage medium, the buffer register unit may be a non-volatile or volatile storage medium in any form, where the volatile storage medium is a storage medium that can temporarily store data and may lose data after power-off The buffer register unit and the function circuit of the peripheral circuit may exchange data using high data bandwidth (high bandwidth). The concept of high bandwidth is a general understanding in the technical field, or may change as technologies develop. This is not specifically limited herein. Therefore, some intermediate data generated in a neural network training process may be temporarily stored in the buffer register unit such that efficiency in reading or writing computation data can be improved. Division of the function circuit is intended to facilitate description of the system architecture in the application scenario. The function circuit mainly includes a data preparation circuit, a data selection circuit, a data reading circuit, and a reverse training computation circuit. Circuits in the function circuit can communicate with each other for data transmission, and the circuits in the function circuit may communicate with the storage medium or the buffer register unit to read data from or write data into the storage medium or the buffer register unit. The data preparation circuit communicates with an RRAM crossbar array to import data into the RRAM crossbar array, and the data selection circuit communicates with the RRAM crossbar array to export data from the RRAM crossbar array. With a resistance variable characteristic, an RRAM can represent a plurality of values, and is different from a conventional storage medium that can represent only two values, 0 and 1. A crossbar array structure including the RRAM is well adapted to a matrix vector multiplication operation in a neural network. In particular, construction of the RRAM crossbar array may be arranged based on a neural network structure, and based on computation of the RRAM crossbar array and a neuron. These are not limited in this application. A control circuit (controller) is configured to control a series of operations of the circuits in the function circuit using control signals. Optionally, the control circuit is further used for an operation related to the RRAM crossbar array. For example, the control circuit sends a control signal to the data preparation circuit. After receiving the control signal, the data preparation circuit switches on a switch corresponding to the control signal, to establish continuity in a path between the data preparation circuit and each row of the RRAM crossbar array such that the data preparation circuit imports data into each row of the RRAM crossbar array.

The data preparation circuit, the data selection circuit, the data reading circuit, and the reverse training computation circuit described in the foregoing embodiment generally may be in a form of a circuit structure or a hardware structure capable of implementing corresponding functions described in the foregoing embodiment. The control circuit may be any controller that can generate a control signal, or may be a device such as a central processing unit or a graphics processing unit. In addition, the data preparation circuit, the data selection circuit, the data reading circuit, the reverse training computation circuit, and the control circuit may be installed on one or more substrates. It should be noted that, alternatively, the data preparation circuit, the data selection circuit, the data reading circuit, the reverse training computation circuit, and the control circuit may be fabricated into an integrated circuit. The system architecture described in the foregoing embodiment as a whole may form a device dedicated to neural network training, or the system architecture may be installed on a device, such as a computer, a server, or a terminal. When technologies allow, the system architecture as a whole may be highly integrated on a silicon chip. It should be noted that, circuits in the system architecture may alternatively be disposed on different devices respectively without affecting functions of the circuits, and perform communication in a wireless or wired manner. For example, the storage medium and the buffer register unit, function circuit, and RRAM crossbar array are disposed on two devices respectively. In conclusion, the system architecture does not change in essence, and presentation in any form shall fall within the protection scope of this application. The system is applied to supporting RRAM-based neural network training, which includes forward computation, backpropagation, and weight update. The system improves computation in the neural network training by at least 5.7 times compared with the central processing unit (CPU) or the graphics processing unit (GPU).

The "data" described in this application is usually transmitted in a form of an electrical signal, such as a current signal or a voltage signal. The electrical signal may be used to indicate sample data, a preprocessing result, a computation result of each step, and the like related to neural network training.

Usually, a buffer in the accompanying drawings in this application is correspondingly a buffer register unit in an embodiment corresponding to FIG. 2.

The following describes the technical solutions provided in the embodiments in this application in detail with reference to the accompanying drawings.

An embodiment of this application describes a structure of a peripheral circuit supporting RRAM-based neural network training, and the peripheral structure includes a data preparation circuit, a data selection circuit, a data reading circuit, and a reverse training computation circuit. Optionally, the peripheral circuit further includes a memory, and the memory may include a buffer register unit.

Figure 3:
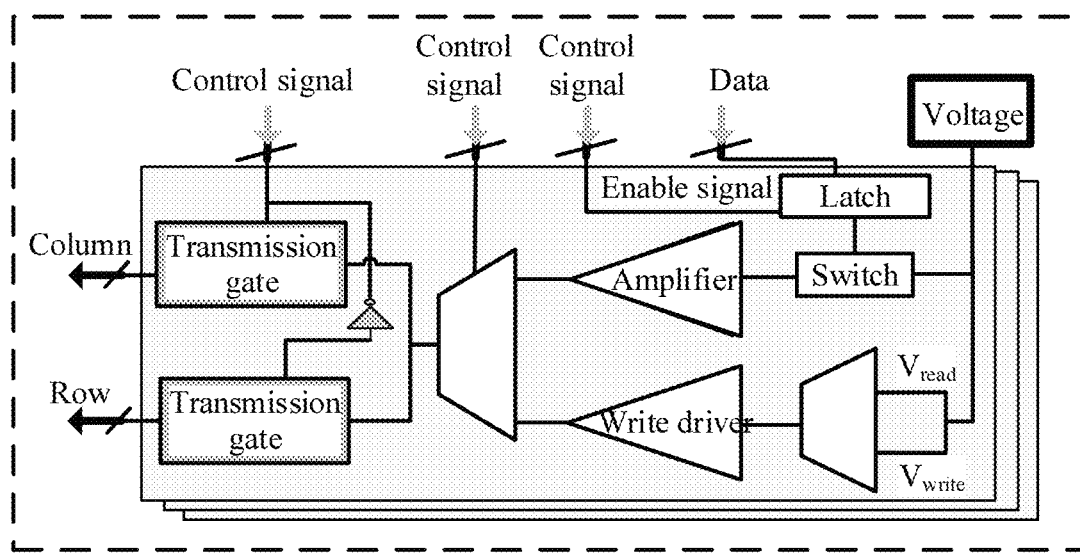
FIG. 3 is a schematic diagram of a data preparation circuit according to an embodiment of this application.

An embodiment of this application describes a data preparation circuit, as shown in FIG. 3. The data preparation circuit is configured to, based on a control signal, selectively preprocess data that is input into the data preparation circuit and import preprocessed data to a row or column of an RRAM crossbar array. Optionally, the control signal may be generated by a control unit based on a current computation process. Control signals corresponding to forward computation and backpropagation are different. The data preparation circuit performs corresponding operations respectively upon receiving different control signals. For example, when current computation is neural network forward computation, a control signal sent by the control unit to the data preparation circuit enables the data preparation circuit to establish continuity in a path connecting all rows of the RRAM crossbar array, and imports a preprocessing result of the data preparation circuit to each row of the RRAM crossbar array. When current computation is neural network backpropagation, a control signal sent by the control unit to the data preparation circuit enables the data preparation circuit to establish continuity in a path connecting all columns of the RRAM crossbar array, and imports a preprocessing result of the data preparation circuit to each column of the RRAM crossbar array. It should be noted that, only continuity of one of the path connecting all the rows of the RRAM crossbar array and the path connecting all the columns of the RRAM crossbar array can be established at a same time.

Further, the data preparation circuit is divided into two constituent parts, two transmission gates (Transfer Gate (TG)) and a wordline driver and decoder (WDD). In FIG. 3, a circuit structure except the two TGs forms the WDD. The WDD is configured to preprocess the data that is input into the data preparation circuit, and transmit a preprocessing result to the RRAM crossbar array using one of the two TGs. The control signal is used to control switch-on or switch-off of the two TGs of the data preparation circuit. Switch-on of one TG enables the data preparation circuit to establish continuity in the path connecting all the rows of the RRAM crossbar array. This corresponds to a case in which the current computation is neural network forward computation. Switch-on of the other TG enables the data preparation circuit to establish continuity in the path connecting all the columns of the RRAM crossbar array. This corresponds to a case in which the current computation is neural network backpropagation. The two TGs are not switched on at a same time but is switched on or off based on a control signal generated in the current computation process. Optionally, the two TGs are replaced with a single-pole double-throw switch device.

The two transmission gates TG are used to control the paths between the data preparation circuit and the RRAM crossbar array, the WDD circuit is reused, and data is selectively imported into each row or each column of the RRAM crossbar array based on current computation, to support neural network forward computation and backpropagation. Such a circuit structure is simpler and has low costs.

Figure 4:
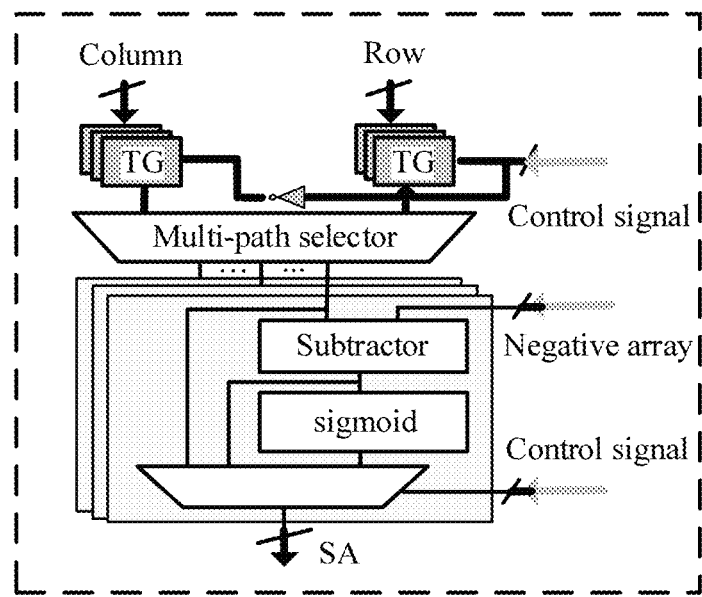
FIG. 4 is a schematic diagram of a data selection circuit according to an embodiment of this application.

An embodiment of this application describes a data selection circuit, as shown in FIG. 4. The data selection circuit is configured to, based on a control signal, selectively export data from each row or column of an RRAM crossbar array, perform corresponding nonlinear computation and a subtraction operation on the exported data, and output processed data to a next circuit unit, for example, a data selection circuit. Similar to that received by the data preparation circuit, the control signal received by the data selection circuit is generated by a control unit based on a current computation process. Details are not described again.

Further, the data selection circuit may be divided into three constituent parts, two TGs, a multi-path selector (Column MUX), and a preprocessing circuit. In FIG. 4, a circuit structure except the two TGs and the multi-path selector forms the preprocessing circuit. The multi-path selector is configured to export data from the RRAM crossbar array using one of the two TGs. The preprocessing circuit is configured to perform preprocessing such as nonlinear function computation and a subtraction operation. The two TGs in the data selection circuit are similar to those in the data preparation circuit. A difference lies in that the data selection circuit exports data from the row or column of the RRAM crossbar array when one of the two TGs is switched on. For details about how to control the TGs, refer to corresponding descriptions about the data preparation circuit. Details are not described herein again.

The two transmission gates TG are used to control paths between the data selection circuit and the RRAM crossbar array, the multi-path selector and the preprocessing circuit are reused, and data is selectively exported from each row or each column of the RRAM crossbar array based on current computation, to support neural network forward computation and backpropagation. Such a circuit structure is simpler and has low costs.

Figure 5:
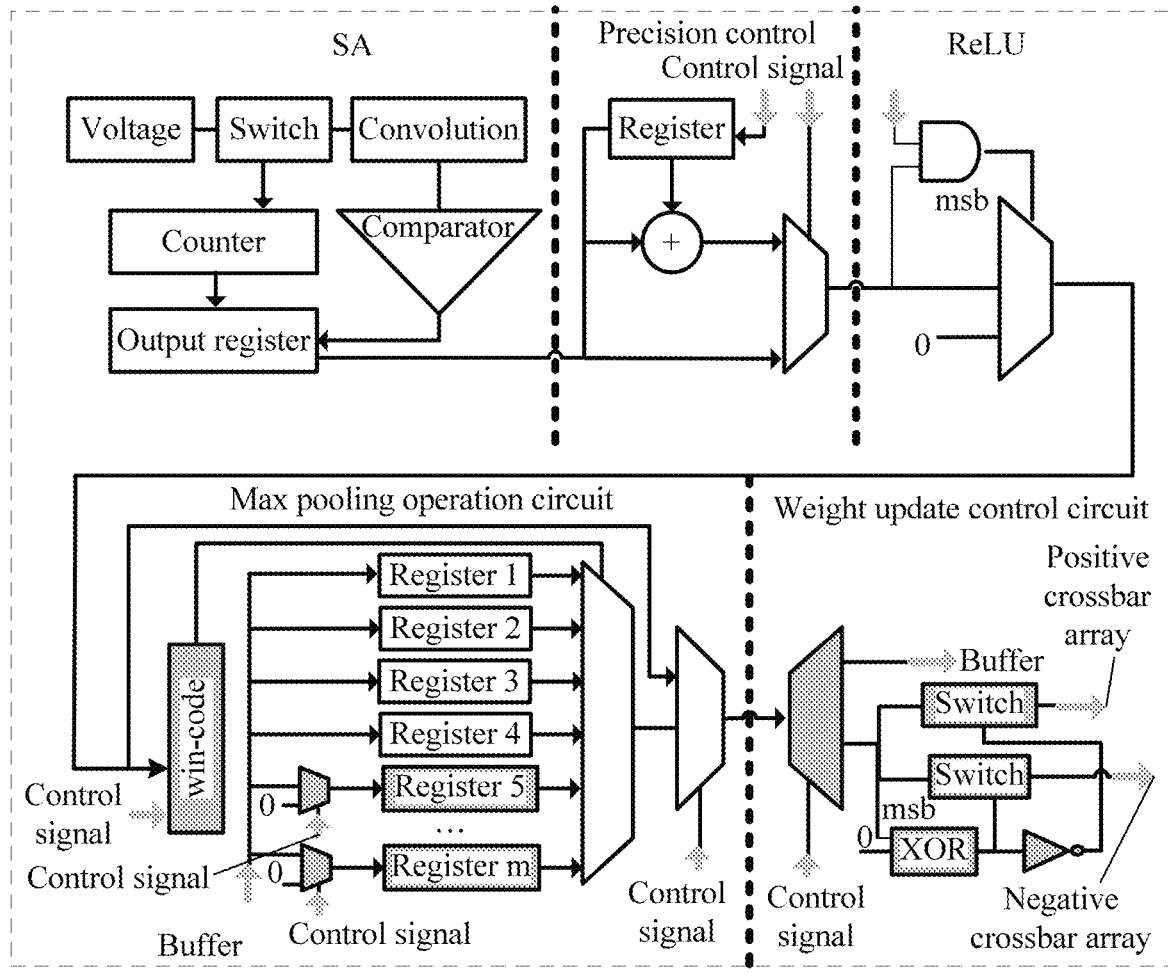
FIG. 5 is a schematic diagram of a data reading circuit according to an embodiment of this application.
Figure 6:
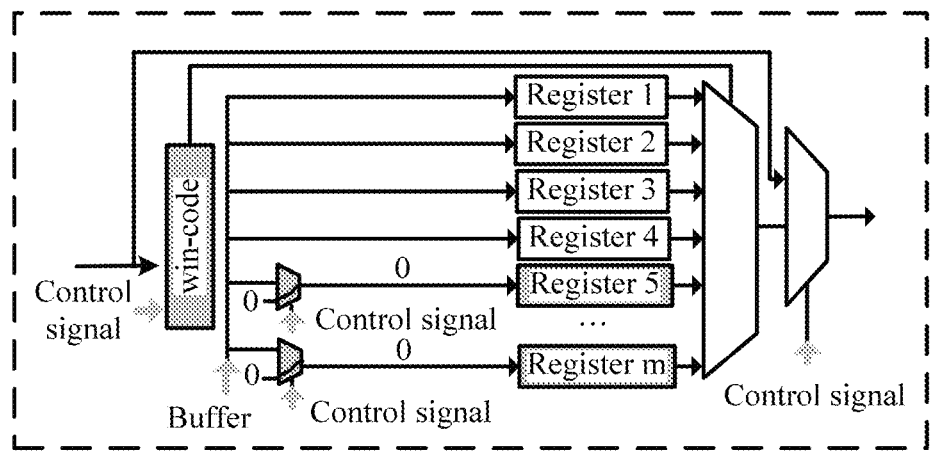
FIG. 6 is a schematic diagram of a max pooling operation circuit according to an embodiment of this application.
Figure 7:
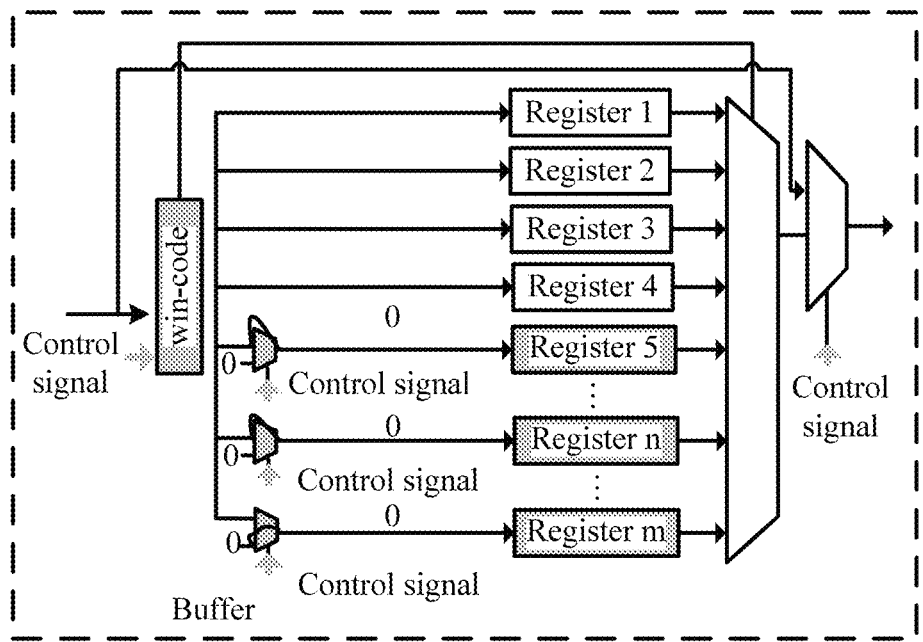
FIG. 7 is a schematic diagram of a max pooling operation circuit according to an embodiment of this application.

An embodiment of this application describes a data reading circuit, as shown in FIG. 5. The data reading circuit includes a sense amplifier circuit, a max pooling operation circuit, and a weight update control circuit. The data reading circuit is configured to perform a weight update control operation, perform a max pooling operation on data that is input by the data selection circuit, and store data obtained after the max pooling operation into a buffer register unit. In FIG. 5, a circuit structure except the max pooling operation circuit and the weight update control circuit forms the sense amplifier circuit. The sense amplifier circuit is configured to read data from the buffer register unit or the data selection circuit, process the data, and transmit processed data to the max pooling operation circuit. FIG. 6 shows the max pooling operation circuit in the data reading circuit. A max pooling operation of neural network forward computation is usually max pooling whose operand has four bits. In a computation process of neural network training represented by deep spiking learning, a max pooling operation whose operand has more than four bits is also performed. The max pooling operation circuit in FIG. 6 can support both the max pooling operation whose operand has four bits and the max pooling operation whose operand has more than four bits, and can be flexibly adjusted based on a requirement. The max pooling operation circuit includes m registers (Reg), namely, Reg 1, Reg 2, . . . , Reg m, and each of Reg 5 to Reg m other than Reg 1, Reg 2, Reg 3, and Reg 4 is further connected to a single-pole double-throw multi-path selector. Further descriptions are provided with reference to FIG. 7. When current computation is a typical max pooling operation whose operand has four bits in neural network computation, each of Reg 5 to Reg m reads 0 using the single-pole double-throw multi-path selector connected to the register. In other words, the single-pole double-throw multi-path selector that is connected to each of Reg 5 to Reg m selectively reads 0 based on a control signal, and inputs read 0 into the corresponding register. First four registers still read, from the buffer register unit, a four-bit operand of a max pooling operation to be performed. When current computation is at a last layer of calculating a maximum value in the deep spiking learning, a single-pole double-throw selector corresponding to each register unit of Reg 5 to Reg n is controlled, based on a quantity n of bits of an operand, to read, from the buffer register unit, an n-bit operand of a max pooling operation to be performed, and a single-pole double-throw multi-path selector corresponding to each register unit of Reg (n+1) to Reg m reads 0 based on a control signal.

Optionally, Reg 1 to Reg m in the max pooling operation circuit shown in FIG. 6 each are connected to a single-pole double-throw multi-path selector, to more flexibly adjust a quantity of registers that normally read data from the buffer register unit, and implement a max pooling operation whose operand has less than four bits.

A register that is connected to a single-pole double-throw multi-path selector is added in the max pooling operation circuit, to support a max pooling operation related to an operand that has a plurality of bits.

Due to technology and manufacturing material constraints on an RRAM, a SET operation is performed on the RRAM. The SET operation is adjustment from high resistance to low resistance, and it is easy to cause a sudden change of an RRAM storage value, and lower reliability of the RRAM. However, the neural network training requires frequent write operations. Each storage node of an RRAM crossbar array cannot store a negative value. In order to use the RRAM to express a weight, each weight w is divided into two parts, w+ and w−, which are stored on nodes corresponding to two RRAM crossbar arrays, and both w+ and w− are positive values. A truth value of each weight w and whether the weight w is positive or negative can be obtained through subtraction between the two parts of the weight, that is, w=w+−w−. A disclosure idea of this application is as follows. When a weight obtained during neural network reverse training is a negative value, it means that the weight needs to be decreased, where the weight is correspondingly a reciprocal of an RRAM resistance, namely, an electrical conductance. In other words, an electrical conductance of a corresponding RRAM storage node needs to be decreased. To reduce SET operations, a RESET operation is performed only on the corresponding node of the RRAM crossbar array storing w+, where the RESET operation is adjustment from low resistance to high resistance, namely, adjustment from a high conductivity value to a low conductivity value. Conversely, when a weight obtained during neural network reverse training is a positive value, it means that the weight needs to be increased. In other words, an electrical conductance of a corresponding RRAM storage node needs to be increased. A RESET operation is performed only on the corresponding node of the RRAM crossbar array storing w−, namely, adjustment from a low conductivity value to a high conductivity value.

Figure 8:
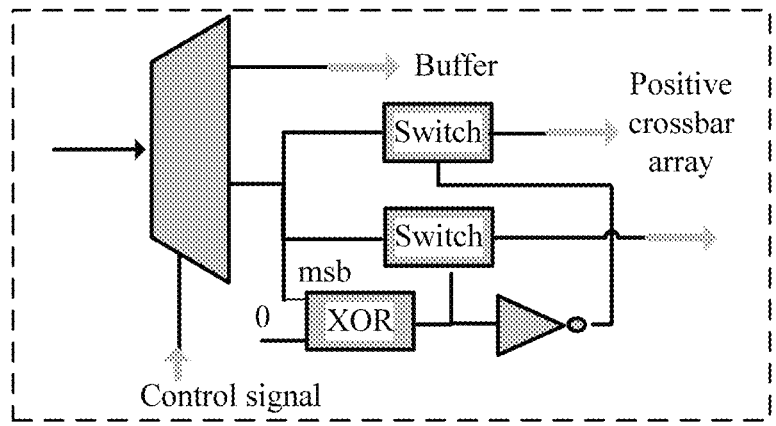
FIG. 8 is a schematic diagram of a weight update control circuit according to an embodiment of this application.

To control the foregoing weight update, optionally, the data reading circuit further includes the weight update control circuit, as shown in FIG. 8. The weight update control circuit is configured to control update of a weight or parameter in a neural network training process.

Further, the weight update control circuit further includes an exclusive OR determining subcircuit, configured to determine whether a weight that is input into the weight update control circuit is a positive or negative value. A control unit generates a first control signal or a second control signal based on a determining result, where the first control signal is used to indicate that the weight is a positive value, the second control signal is used to indicate that the weight is a negative value, the first control signal is used to control a corresponding node of the RRAM crossbar array storing W− to perform a RESET operation, and the second control signal is used to control a corresponding node of the RRAM crossbar array storing W+ to perform a RESET operation. For example, if a computation result output by the exclusive OR circuit is 1, it means that the weight is a positive value, and a switch that is connected to the RRAM crossbar array storing w− is controlled to be switched on, thereby implementing a corresponding weight update operation. Conversely, if a computation result output by the exclusive OR circuit is 0, it means that the weight is a negative value, and a switch that is connected to the RRAM crossbar array storing w+is switched on, thereby implementing a corresponding weight update operation.

A weight update manner is optimized using the weight update control circuit, reducing SET operations and improving reliability of the RRAM in writing.

An embodiment of this application describes a reverse training computation circuit, and the reverse training computation circuit is configured to calculate an error and a derivative of data that is input into the reverse training computation circuit. The reverse training computation circuit includes a derivative calculation circuit and an error calculation circuit.

Figure 9:
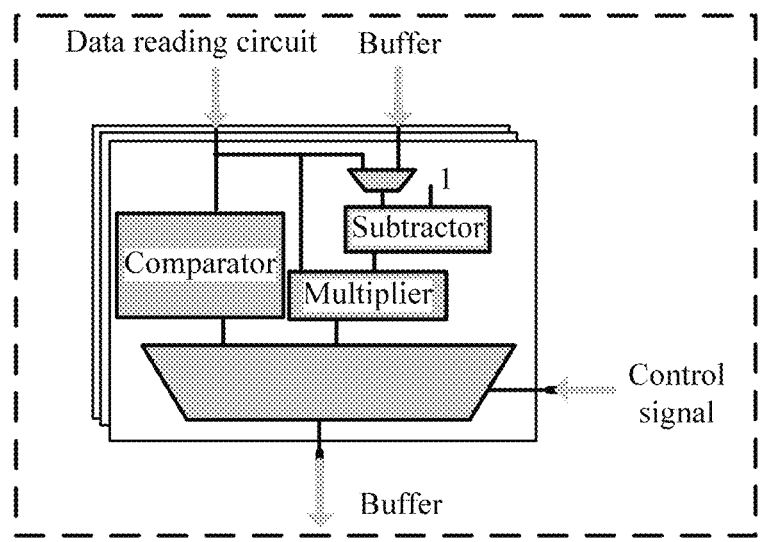
FIG. 9 is a schematic diagram of a derivative calculation circuit according to an embodiment of this application.

FIG. 9 shows a derivative calculation circuit described in an embodiment of this application. The derivative calculation circuit includes two double-path selectors, a comparator, a subtractor, and a multiplier, and can perform derivative calculation on a typical nonlinear function related to neural network training, for example, a ReLU (Rectified Linear Units) function and a sigmoid function. Derivatives of the two nonlinear functions are as follows:

derivative of a ReLU function:

$$f'(x) = \begin{cases} 1, & \text{if } x > 0 \\ 0, & \text{otherwise} \end{cases}$$

derivative of a sigmoid function: f'(x)=f(x)(1−f(x))

FIG. 9 shows a specific structure of the derivative calculation circuit. An output port of one double-path selector (located in an upper right area in FIG. 9) is connected to an input port of the subtractor, an output port of the subtractor is connected to an input port of the multiplier, an output port of the multiplier is connected to an input port of the other double-path selector (located in a bottom area in FIG. 9), and an output port of the comparator is connected to another input port of the other double-path selector.

For derivative calculation of the ReLU function, the derivative calculation circuit inputs, into the comparator (Comp) of the derivative calculation circuit, data that is output from the data reading circuit, to perform a comparison operation on the data, and a result output after the comparison operation is a derivative calculation result of the ReLU function.

For derivative calculation of the sigmoid function, the derivative calculation circuit reads, from the data reading circuit or the buffer register unit, a value f(x) obtained after forward computation, inputs f(x) into the subtractor in the derivative calculation circuit to subtract f(x) from 1, and inputs a result of the subtraction into the multiplier in the derivative calculation circuit to multiply the result and f(x). A result output by the multiplier is a derivative calculation result of the sigmoid function.

The derivative calculation circuit selectively outputs a computation result from the comparator or the multiplier based on a control signal using the double-path selector that is connected to the output port of the comparator and connected to the output port of the multiplier in the derivative calculation circuit. Different control signals are generated by a control circuit for different functions of current derivative calculation. For example, for derivation computation of the ReLU function, the double-path selector that is connected to the comparator in the derivative calculation circuit is controlled, using a control signal, to select the result output by the comparator as an output result of the derivative calculation circuit, to implement derivative calculation of the ReLU function. Alternatively, for derivative calculation of the sigmoid function, the double-path selector that is connected to the multiplier in the derivative calculation circuit is controlled, using a control signal, to select the result output by the multiplier as an output result of the derivative calculation circuit, to implement derivative calculation of the sigmoid function. Further, the derivative calculation circuit stores the output result into the buffer register unit/a storage medium.

Derivative calculation in RRAM-based neural network training can be supported using the derivative calculation circuit, to improve derivative calculation efficiency of the neural network training.

Figure 10:
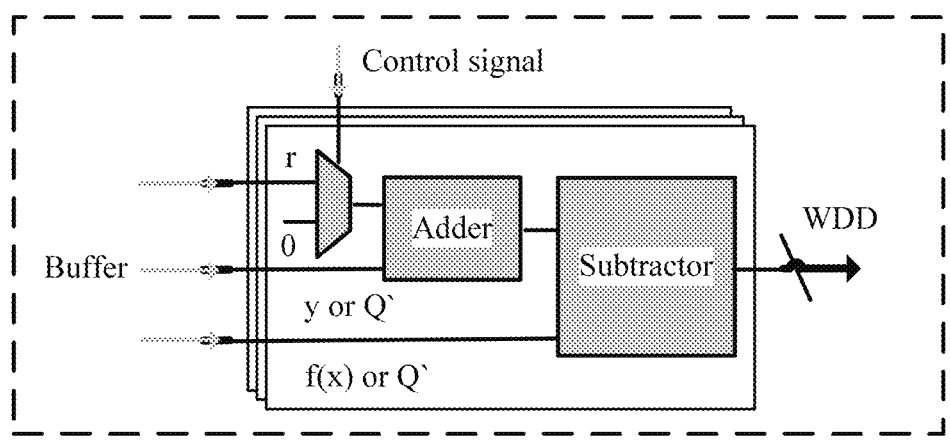
FIG. 10 is a schematic diagram of an error calculation circuit according to an embodiment of this application.

FIG. 10 shows an error calculation circuit described in an embodiment of this application. The error calculation circuit includes a double-path selector, an adder, and a subtractor, and can be applied to error calculation in a neural network training process. The neural network training is typically divided into supervised learning training and deep spiking learning training.

FIG. 10 shows a specific structure of the error calculation circuit. An output port of the double-path selector in the error calculation circuit is connected to an input port of the adder in the error calculation circuit, and an output port of the adder is connected to an input port of the subtractor in the error calculation circuit. The double-path selector is configured to selectively read 0 or r based on a received control signal, where r is a weight that is stored in the memory, and may be dynamically refreshed based on a quantity of training times. The adder is configured to, based on the control signal, selectively read y* from the buffer register unit, or read $\gamma \max_a Q'(s', a'; W_B)$ output by the data reading circuit, and add up the data input by the double-path selector and the data read from the buffer register unit or the data reading circuit. The subtractor is configured to, based on the control signal, read, from the buffer register unit based on the control signal, f(x) or Q(s, a; $W_A$) obtained after forward computation, and subtract, from the value obtained after forward computation, a sum input by the adder.

A corresponding control signal is generated based on different neural network training, to control specific data read by the double-path selector, the adder, and the subtractor in the error calculation circuit. The following uses supervised learning training and deep spiking learning training as an example, to describe the error calculation circuit in detail.

If the neural network training is supervised learning neural network training, the double-path selector in the error calculation circuit is controlled, using a control signal, to select 0 and input selected 0 to the adder that is connected to the double-path selector, the error calculation circuit reads a truth value y* in sample data of the neural network training from the buffer register unit, and inputs the read truth value y* into the adder, the adder adds up y* and 0, and inputs the sum to the subtractor that is connected to the adder, and the error calculation circuit reads, from the buffer register unit, a value f(x) obtained after neural network forward computation, and inputs f(x) into the subtractor, to implement f(x)−y*, to obtain an error calculation result of the supervised learning neural network training. Further, the obtained error calculation result is transmitted to the data preparation circuit to perform reverse training computation and error propagation.

If the neural network training is deep spiking learning neural network training, the double-path selector in the error calculation circuit is controlled, using a control signal, to select r and input selected r into the adder that is connected to the double-path selector, the error calculation circuit reads, from the buffer register unit or the data reading circuit, a value $\gamma \max_a Q'(s', a'; W_B)$ obtained after forward computation, and inputs the value into the adder, the adder adds up $\gamma \max_a Q'(s', a'; W_B)$ and r, and inputs a sum to the subtractor that is connected to the adder, the error calculation circuit reads $Q(s, a; W_A)$ from the buffer register unit and inputs $Q(s, a; W_A)$ into the subtractor, and the subtractor subtracts $Q(s, a; W_A)$ from the sum input by the adder. Further, the error calculation circuit transfers an obtained error calculation result to the data preparation circuit to perform reverse training computation and error propagation.

Error calculation in RRAM-based neural network training can be supported using the error calculation circuit, to improve error calculation efficiency of the neural network training.

An embodiment of this application uses supervised learning as an example, to describe in detail a process in which the peripheral circuit described in this embodiment of this application supports supervised learning RRAM-based neural network training. The process mainly includes forward computation, backpropagation, and weight update.

(1) Forward Computation

Sample data (x, y) used for supervised learning neural network training is read from a memory, and the read sample data is stored into a buffer register unit (Buffer array), where x is input data in the neural network forward computation, and y is a corresponding truth value output in the neural network forward computation. A data flow direction is shown by arrows numbered 1 in FIG. 11. The sample data x is simultaneously sent to data preparation circuits corresponding to a plurality of RRAM crossbar arrays for preprocessing, as shown by directions of arrows numbered 2 in FIG. 11. Due to forward computation, after the data preparation circuit shown in FIG. 3 preprocesses the data, a TG that is in the data preparation circuit and that is connected to each row of the RRAM crossbar array receives a control signal, and the TG is controlled to be switched on such that the data preparation circuit establishes continuity in a path connecting all rows of the RRAM crossbar array, and the sample data x flows into the RRAM crossbar array along the path, whose continuity is established, connecting all the rows of the RRAM crossbar array, to perform matrix vector multiplication calculation on the sample data x.

Figure 12A:
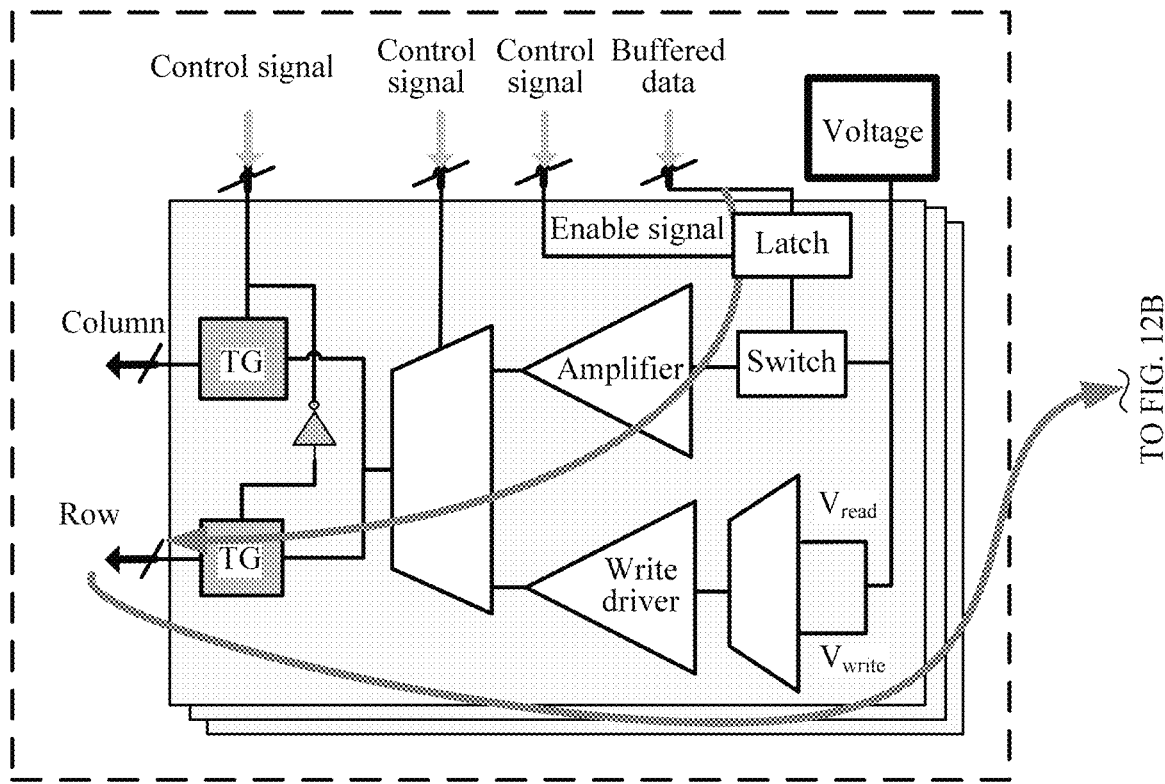
FIG. 12A, FIG. 12B, and FIG. 12C are schematic diagrams in which data flows into and flows out of an RRAM crossbar array according to an embodiment of this application.
Figure 12B:
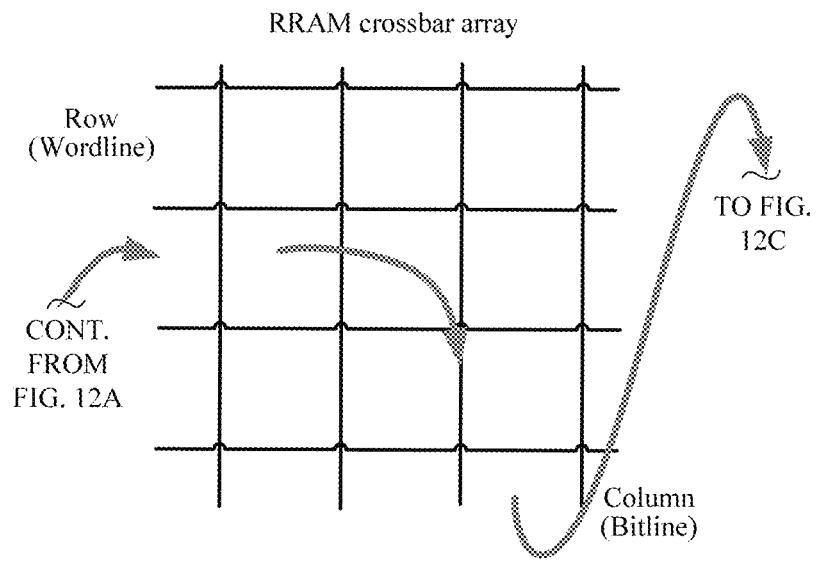
Figure 12C:
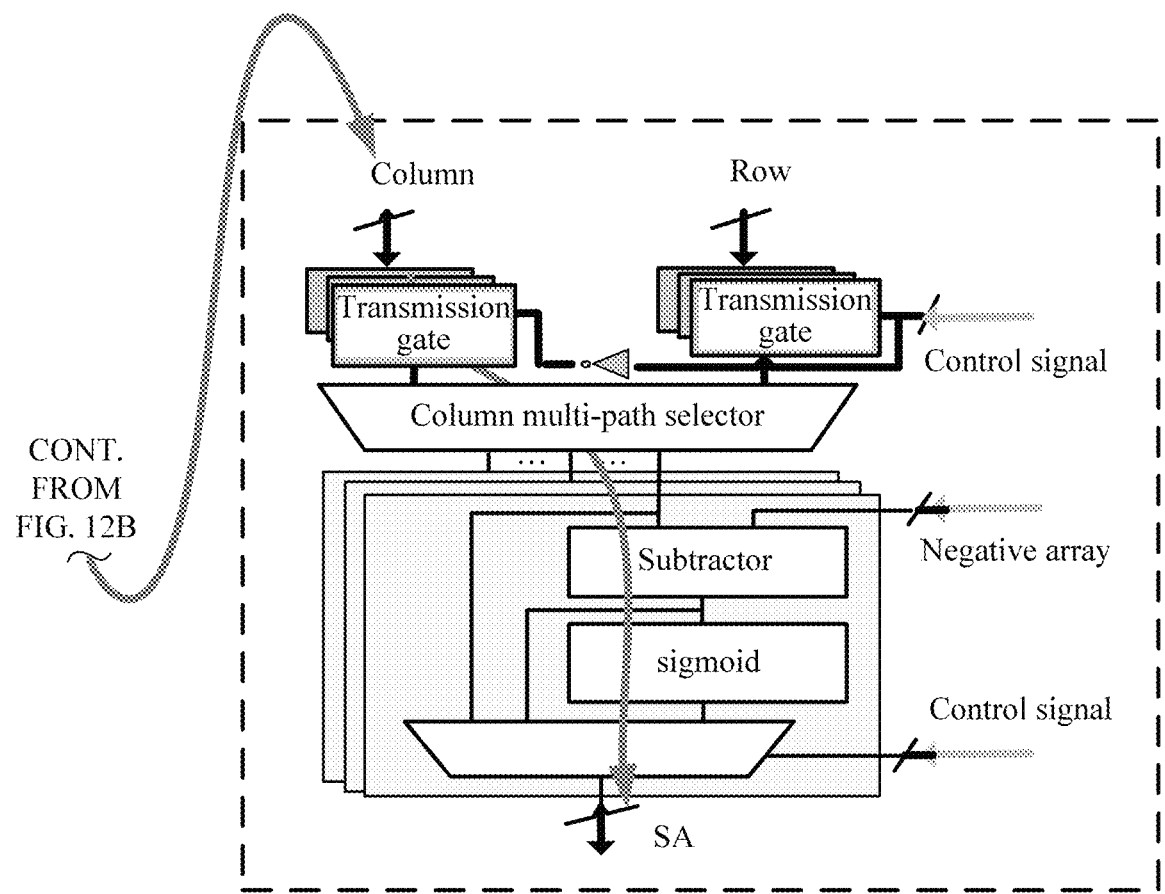

Subsequently, as shown in FIG. 12A, FIG. 12B, and FIG. 12C, the sample data x flows into each row of the RRAM crossbar array, and undergoes simulation computation with each node of the RRAM crossbar array. An output result is output from each column of the RRAM crossbar array. Then a TG that is in the data selection circuit shown in FIG. 4 and that is connected to each column of the RRAM crossbar array receives a control signal, and the TG is controlled to be switched on such that the data selection circuit establishes continuity in a path connecting all columns of the RRAM crossbar array, and a selector Column Mux in the data selection circuit is used to selectively read a computation result from the RRAM crossbar array in a column form.

In addition, a control signal is received using a single-pole double-throw multi-path selector corresponding to each of Reg 5 to Reg m in the max pooling operation circuit, shown in FIG. 6, of the data reading circuit. The single-pole double-throw multi-path selector that receives the control signal inputs 0 such that a max pooling operation whose operand has four bits and that is for forward computation can be implemented, and finally a computation result is stored into the buffer register unit. A data flow direction is shown by arrows numbered 3 in FIG. 11.

(2) Backpropagation

Error calculation: A result y' and a truth value y output after the forward computation are read from the buffer register unit, and are transmitted to the error calculation circuit shown in FIG. 10. By controlling the error calculation circuit shown in FIG. 10, an error $\Delta y$ between the value and the truth value obtained after the neural network forward computation is output, and is stored into the buffer register unit. For specific error calculation, refer to descriptions in the embodiment corresponding to FIG. 10. Details are not described herein again.

Derivative calculation: As shown by arrows numbered 1 in FIG. 13, the error $\Delta y$ that is calculated by the error calculation circuit and that is in stored in the buffer register unit is transmitted to the reverse training computation circuit shown in FIG. 9, and the error $\Delta y$, together with a derivative calculated by the derivative calculation circuit, is transmitted to a corresponding unit for gradient error calculation. In an embodiment, point multiplication is performed on the error $\Delta y$ and a derivative obtained after the derivative calculation, to obtain a gradient error. This application imposes no limitation on a unit for calculating the gradient error. In addition, the gradient error is used for multiplication by a weight to obtain an error of a previous layer such that the error is propagated forward layer by layer. In a derivative calculation process, the derivative calculation circuit shown in FIG. 9 is controlled, based on whether a function whose derivative is to be calculated is a ReLU function or a sigmoid function, to implement corresponding derivative calculation. For specific derivative calculation, refer to descriptions of the embodiment corresponding to FIG. 9. Details are not described herein again.

Backpropagation: The derivative (namely, gradient) obtained by the derivative calculation circuit is sent along one path to the RRAM crossbar array corresponding to the neural network for backpropagation. A data flow direction is shown by directions of arrows numbered 2 in FIG. 13. An embodiment of a computation process is as follows. After the data preparation circuit shown in FIG. 3 preprocesses the derivative calculated by the derivative calculation circuit, a TG that is in the data preparation circuit and that is connected to each column of the RRAM crossbar array receives a control signal, and the TG is controlled to be switched on such that the data preparation circuit establishes continuity in a path connecting all columns of the RRAM crossbar array, and the derivative calculated by the derivative calculation circuit flows into the RRAM crossbar array along the path, whose continuity is established, connecting to all the columns of the RRAM crossbar array.

Figure 14A:
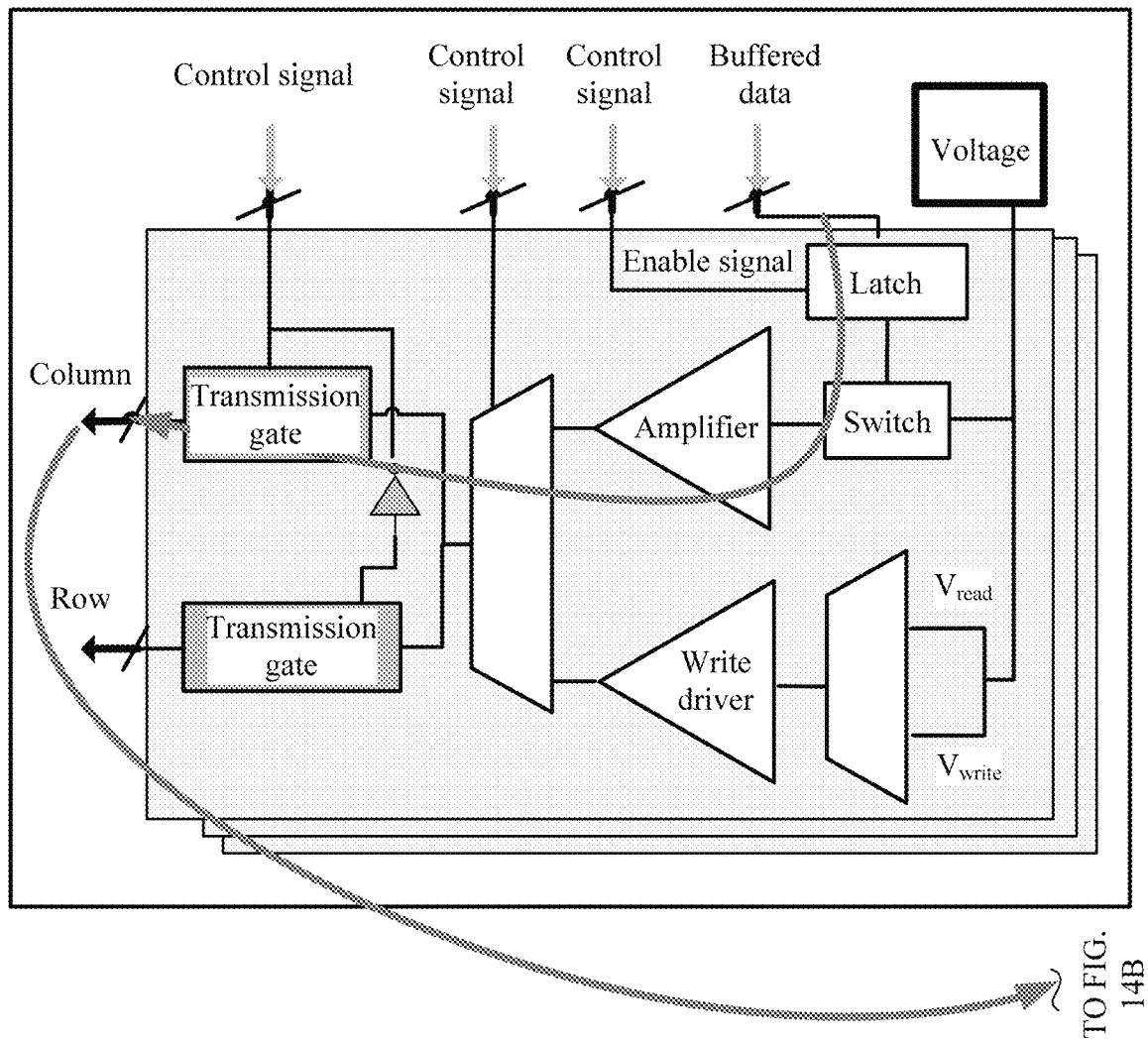
FIG. 14A, FIG. 14B, and FIG. 14C are schematic diagrams in which data flows into and flows out of an RRAM crossbar array according to an embodiment of this application.
Figure 14B:
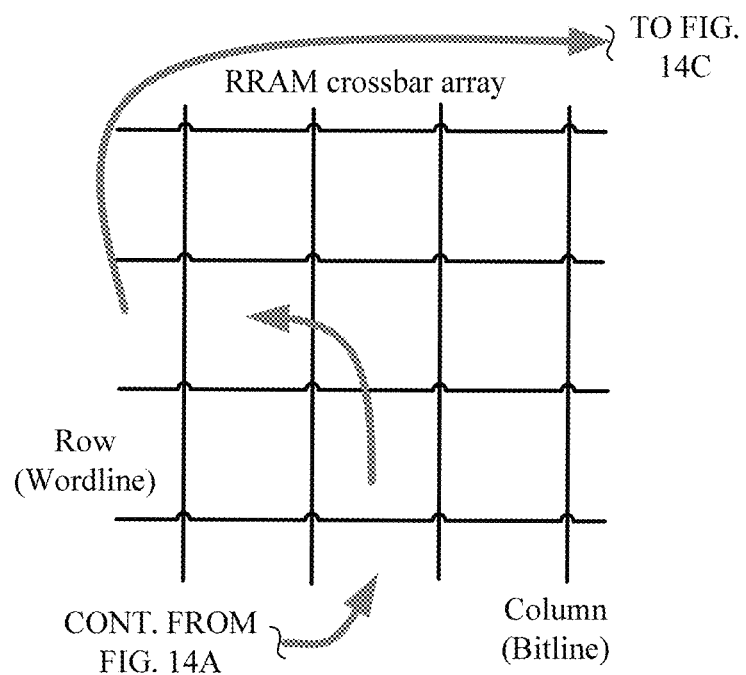
Figure 14C:
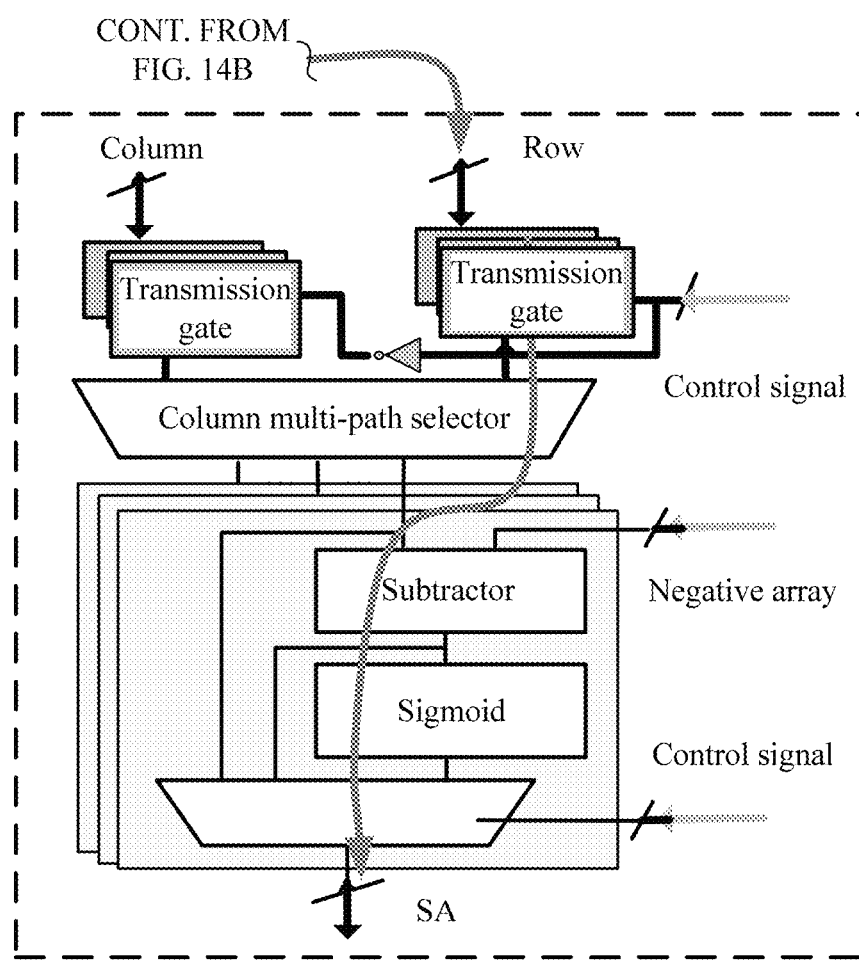

Then, as shown in FIG. 14A, FIG. 14B, and FIG. 14C, the derivative calculated by the derivative calculation circuit flows into each column of the RRAM crossbar array for back computation (opposite to neural network forward computation), and a result obtained through computation of the RRAM crossbar array is output from each row of the RRAM crossbar array. Then, a TG that is in data selection circuit shown in FIG. 4 and that is connected to each row of the RRAM crossbar array receives a control signal, and the TG is controlled to be switched on such that the data selection circuit establishes continuity in a path connecting all rows of the RRAM crossbar array, and a selector Column Mux in the data selection circuit is used to selectively read a computation result from the RRAM crossbar array in a row form. The computation result read from the RRAM crossbar array is input into the data reading circuit, and finally a derivative (namely, gradient) propagation result is stored into the buffer register unit.

In addition, the derivative result calculated by the derivative calculation circuit flows along the other path into the data preparation circuit for a weight error calculation between the derivative and the input sample data x, to perform weight update. A data flow direction is shown by arrows numbered 3 in FIG. 13.

(3) Weight Update

Figure 11:
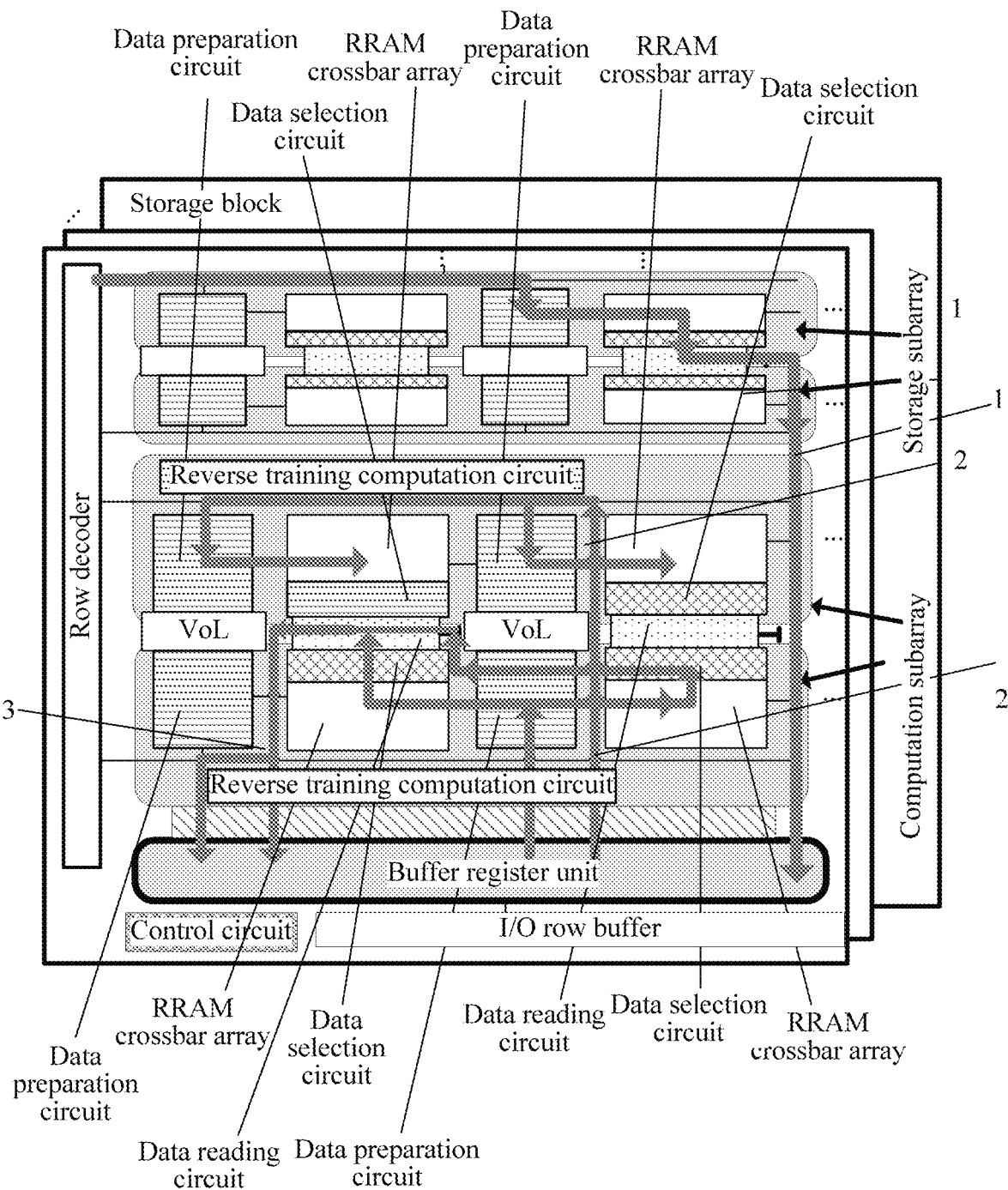
FIG. 11 is a schematic diagram of a data flow direction of forward computation according to an embodiment of this application.
Figure 13:
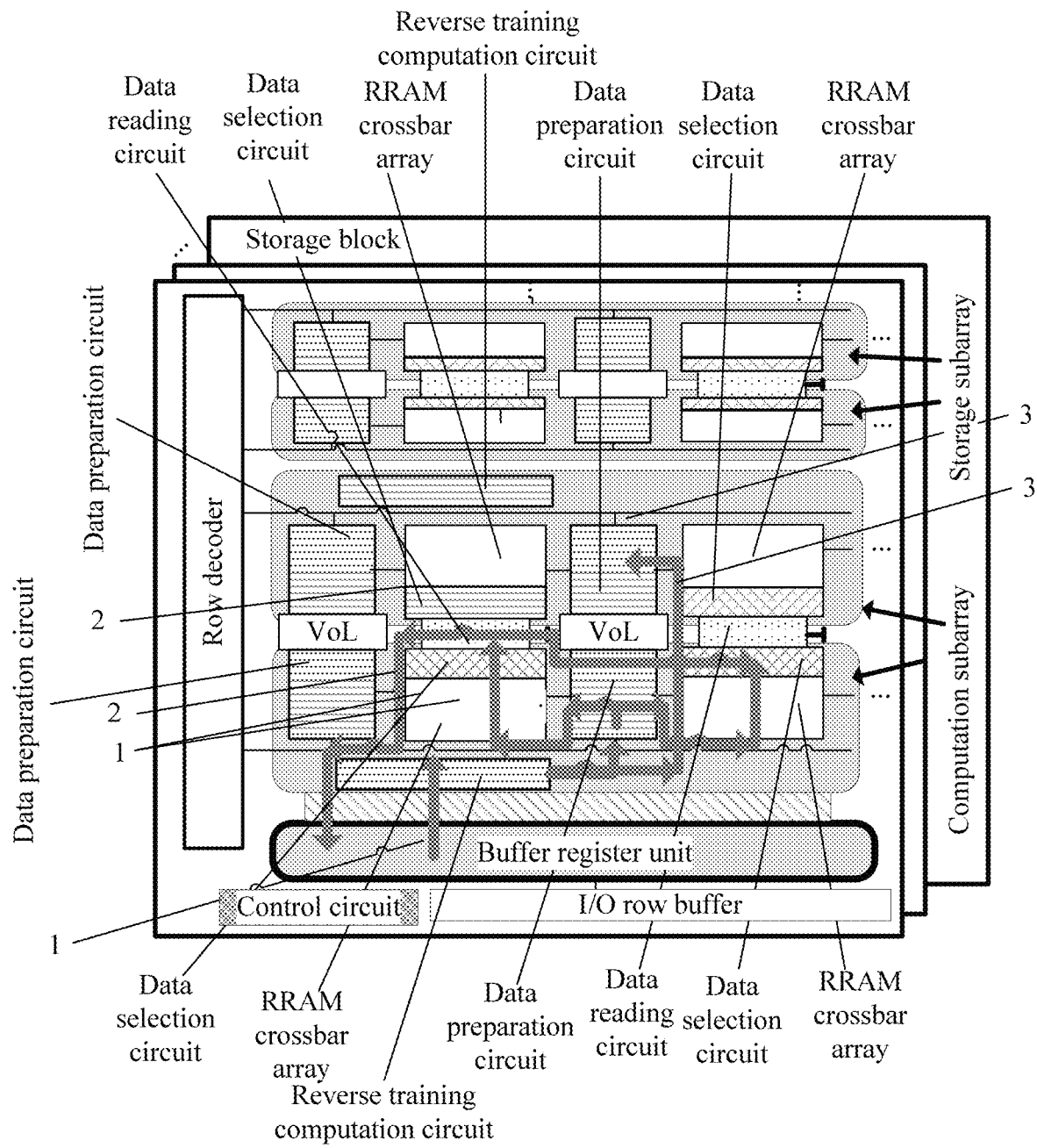
FIG. 13 is a schematic diagram of a data flow direction of backpropagation according to an embodiment of this application.
Figure 15:
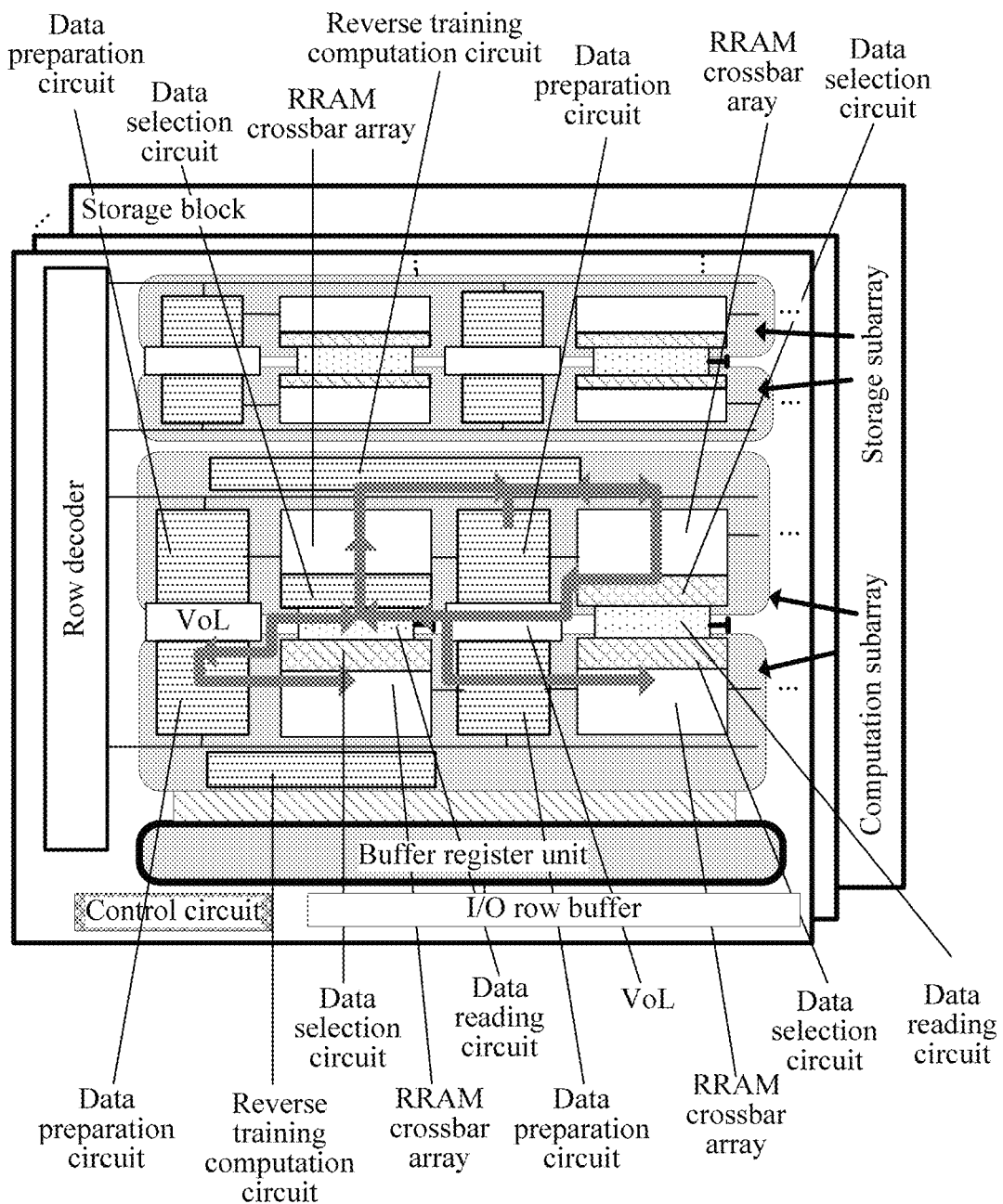
FIG. 15 is a schematic diagram of a data flow direction of a weight update according to an embodiment of this application.

After the forward computation shown in FIG. 11 and the backpropagation computation shown in FIG. 13 are completed, a vector matrix multiplication operation is performed on the input sample data x and the gradient error to obtain a corresponding weight change ΔW. A data flow direction is shown by directions of arrows in FIG. 15. The weight update control circuit shown in FIG. 8 is controlled using a control signal to implement update of a weight stored in a corresponding RRAM crossbar array. For a specific weight update control manner, refer to descriptions of the embodiment corresponding to FIG. 8. Details are not described herein again.

According to the peripheral circuit described in this embodiment of this application, an RRAM crossbar array structure can be fully utilized, and acceleration of supervised learning network training, which includes forward computation, backpropagation, and weight update, can be implemented on the basis of increasing limited circuits. Reliability of an RRAM in writing during neural network training can be improved.

An embodiment of this application uses deep spiking learning as an example, to describe in detail a process in which the peripheral circuit described in this embodiment of this application supports RRAM-based deep spiking learning neural network training.

Figure 16:
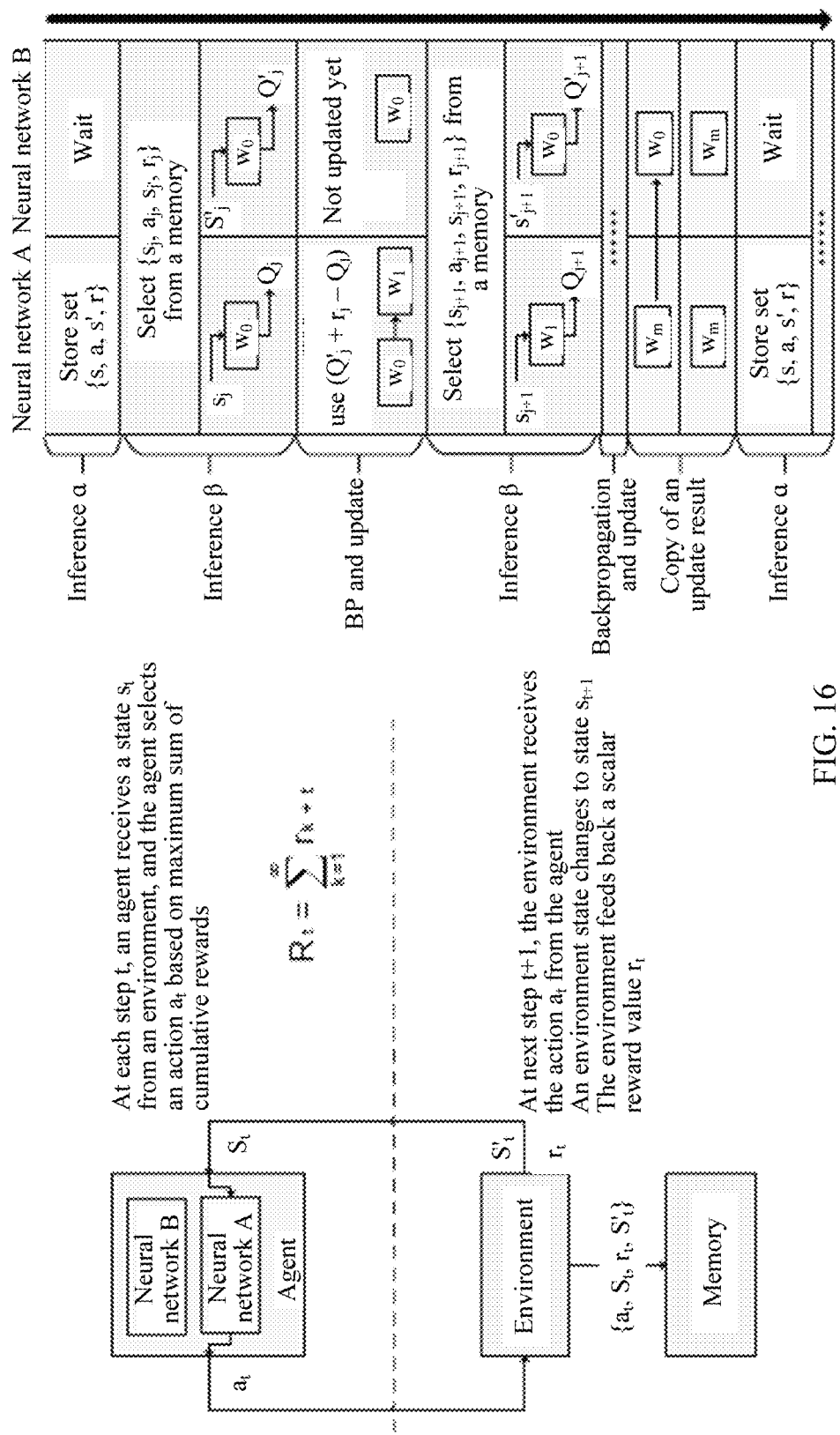
FIG. 16 is a schematic diagram of deep spiking learning neural network training according to an embodiment of this application.

Deep spiking learning includes three stages, forward computation, backpropagation, and weight update. Different from supervised learning, deep spiking learning usually uses two neural networks to improve efficiency in training convergence, as shown in FIG. 16. A computation process of the deep spiking learning is described briefly as follows. First, forward computation is performed on two neural networks A and B that have a same setting, and backpropagation and weight update are performed on the neural network A based on a gradient error while a weight of the network B remains unchanged. After training of m iterations, a weight of the neural network A is copied to the neural network B to replace the initial weight of the neural network B. Such iterations are performed in the neural network B until the training converges.

Two main computation processes, namely, error backpropagation and weight update of the deep spiking learning are both similar to those in the supervised learning described in the embodiments of this application. Details are not described herein again. A difference between the deep spiking learning and the supervised learning in calculating a maximum value during forward computation is described herein. In the foregoing computation process of the deep spiking learning, forward computation processes of both the neural network A and the neural network B are related to an operation of calculating a maximum value. The neural network A needs to perform an action of calculating a maximum Q value, and the neural network B also performs calculation to output a maximum Q' value. An operation of calculating a maximum value in the deep spiking learning is different from a max pooling operation in the supervised learning in that an operand usually has more than four bits in the deep spiking learning. Assuming that a quantity of output dimensions of a neural network corresponding to the deep spiking learning is n, it means that an operation of calculating a maximum value needs to be performed on n numbers. According to the peripheral circuit described in this embodiment of the present disclosure, a plurality of register units (assuming that there are m register units) are designed in the data reading circuit to store operands. Single-pole double-throw multi-path selectors corresponding to the fifth to the $n^{th}$ register units are controlled to read an operand of a maximizing operation to be performed. Single-pole double-throw multi-path selectors corresponding to the remaining m-n register units selectively read 0. For a specific max pooling process, refer to descriptions in the embodiment corresponding to FIG. 7. Details are not described herein again.

According to the peripheral circuit described in this embodiment of this application, an RRAM crossbar array structure is fully utilized, and deep spiking learning neural network training, which includes forward computation, backward propagation, and weight update, can be supported on the basis of increasing limited circuits. In addition, neural network training can be accelerated, and reliability of an RRAM in writing during neural network training can be improved.

Finally, it should be noted that the foregoing embodiments are merely intended for describing the technical solutions of the present disclosure, but not for limiting the present disclosure. Although the present disclosure is described in detail with reference to the foregoing embodiments, persons of ordinary skill in the art should understand that they may still make modifications to the technical solutions described in the foregoing embodiments or make equivalent replacements to some or all technical features thereof, without departing from the scope of the technical solutions of the embodiments of the present disclosure.

What is claimed is:

1. A peripheral circuit configured to support resistive random access memory (RRAM) crossbar array-based neural network training of a RRAM crossbar array, comprising:
    a data preparation circuit configured to:
        perform first preprocessing on first data that is received by the data preparation circuit, wherein the first data comprise sample data used for the RRAM crossbar array-based neural network training; and
        selectively import preprocessed data obtained by the first preprocessing to a row or column of the RRAM crossbar array based on a first control signal;
    a data selection circuit configured to:
        selectively export second data from the row or column of the RRAM crossbar array based on a second control signal, wherein the second data is data obtained by performing computation on the preprocessed data in the RRAM crossbar array, a correspondence between the first control signal and the second control signal indicates that the data preparation circuit importing the preprocessed data obtained by performing the first preprocessing on the first data to the row of the RRAM crossbar array based on the first control signal corresponds to the data selection circuit exporting the second data from the column of the RRAM crossbar array based on the second control signal, and the data preparation circuit importing the preprocessed data obtained by performing the first preprocessing on the first data to the column of the RRAM crossbar array based on the first control signal corresponds to the data selection circuit exporting the second data from the row of the RRAM crossbar array based on the second control signal; and perform second preprocessing on the second data to obtain third data;

a data reading circuit configured to:
  perform a weight update control operation; and
  perform a max pooling operation on the third data received by the data reading circuit to obtain fifth data; and a reverse training computation circuit configured to calculate an error and a derivative of the fifth data.

2. The peripheral circuit according to claim 1, further comprising a storage medium configured to store the sample data and data from at least one of the data preparation circuit, the data selection circuit, the data reading circuit, or the reverse training computation circuit.

3. The peripheral circuit according to claim 2, wherein the storage medium comprises:
  a sample data storage unit configured to store the sample data; and
  a buffer register is configured to store the data from the data preparation circuit, the data selection circuit, the data reading circuit, or the reverse training computation circuit.

4. The peripheral circuit according to claim 1, wherein the data preparation circuit comprises:
  a wordline driver and decoder (WDD) configured to:
    receive the first data; and
    perform the first preprocessing on the first data to obtain the preprocessed data; and
  two first transmission gates (TGs) that are connected in parallel and connected to an output port of the WDD, wherein the two first TGs comprise a first row TG and a first column TG, wherein the first row TG and the first column TG are not switched on at a same time, and wherein the first row TG is configured to:
    establish continuity in a path connecting the WDD to each row of the RRAM crossbar array based on the first control signal; and
    import the preprocessed data output by the WDD to each row of the RRAM crossbar array, and
  wherein the first column TG is configured to:
    establish continuity in a path connecting the WDD to each column of the RRAM crossbar array based on the first control signal; and
    import the preprocessed data output by the WDD to each column of the RRAM crossbar array.

5. The peripheral circuit according to claim 3, wherein the data selection circuit comprises:
  two second transmission gates (TGs) that are connected in parallel and connected to an input port of a multi-path selector, wherein the two second TGs comprise a second row TG and a second column TG, wherein the second row TG and the second column TG are not switched on at a same time,
  wherein the second row TG is configured to establish continuity in a path connecting the multi-path selector to each row of the RRAM crossbar array based on the second control signal, wherein the second column TG is configured to establish continuity in a path connecting the multi-path selector to each column of the RRAM crossbar array based on the second control signal;
  wherein the multi-path selector is configured to export the second data from the RRAM crossbar array along the paths switched on by the two second TGs; and a preprocessing circuit configured to:
  perform the second preprocessing on the second data exported by the multi-path selector to obtain the third data; and
  store the third data into the buffer register.

6. The peripheral circuit according to claim 3, wherein the data reading circuit comprises:
  a sense amplifier circuit configured to read the third data from the buffer register or the data selection circuit;
  a max pooling operation circuit configured to:
    perform the max pooling operation on the third data read by the sense amplifier circuit to obtain the fifth data; and
    store the fifth data into the buffer register, wherein the fifth data is a value obtained after forward computation; and
  wherein the max pooling operation circuit comprises at least one first register, wherein an input port of each of the at least one first register is connected to a first selector, and wherein the first selector is configured to, based on a third control signal, selectively read 0, or read an operand of a max pooling operation to be performed from the buffer register and input the operand into a corresponding first register.

7. The peripheral circuit according to claim 6, wherein the max pooling operation circuit further comprises four second registers, configured to read the operand of the max pooling operation to be performed from the buffer register.

8. The peripheral circuit according to claim 3, wherein the reverse training computation circuit comprises:
  an error calculation circuit configured to:
    calculate an error based on the fifth data read from the data reading circuit or the buffer register; and
    store the calculated error into the buffer register;
  a derivative calculation circuit configured to:
    calculate a derivative of a nonlinear function of the fifth data read from the data reading circuit or the buffer register; and
    store the calculated derivative into the buffer register, wherein the fifth data comprises a value obtained after forward computation.

9. The peripheral circuit according to claim 8, wherein the nonlinear function comprises a rectified linear unit (ReLU) function and a sigmoid function.

10. The peripheral circuit according to claim 8, wherein the derivative calculation circuit comprises:
  a second selector configured to read, from the data reading circuit or the buffer register, the value obtained after forward computation;
  a first subtractor configured to subtract, from 1, the value that is obtained after forward computation and that is input by the second selector to obtain a first difference, wherein an output port of the second selector is connected to an input port of the first subtractor;
  a multiplier configured to multiply the first difference to obtain a first product, wherein an output port of the first subtractor is connected to an input port of the multiplier;
  a third selector, wherein an output port of the multiplier is connected to a first input port of the third selector; and
  a comparator configured to perform a comparison operation on the value that is obtained after forward computation and that is input by the data reading circuit to obtain a comparison result, wherein an output port of the comparator is connected to a second input port of the third selector, and wherein the third selector is configured to, based on a fourth control signal:

selectively select the comparison result from the comparator or select the first product from the multiplier; and store the comparison result or the first product as a derivative into the buffer register.

11. The peripheral circuit according to claim 8, wherein the error calculation circuit comprises:
a fourth selector;
an adder, wherein an output port of the fourth selector is connected to an input port of the adder; and
a second subtractor, wherein an output port of the adder is connected to an input port of the second subtractor,
wherein the fourth selector is configured to, based on a fifth control signal:
selectively read 0 or a weight r; and
input read 0 or r into the adder,
wherein the adder is configured to:
read seventh data from the data reading circuit or the buffer register; and
add up data input by the fourth selector and the read seventh data to obtain a first sum, and
wherein the second subtractor is configured to:
read eighth data from the data reading circuit or the buffer register; and
subtract the eighth data from the first sum input by the adder to obtain an error.

12. The peripheral circuit according to claim 11, wherein the RRAM crossbar array-based neural network training comprises supervised learning neural network training, wherein the fourth selector is further configured to, based on the fifth control signal:
read 0;
and input read 0 into the adder;
wherein the adder is further configured to:
read, from the buffer register, a truth value y* corresponding to the sample data from the buffer register;
add up the truth value y* corresponding to the sample data and 0 input by the fourth selector to obtain the first sum; and
input the first sum into the second subtractor, and
wherein the second subtractor is further configured to:
read, from the data reading circuit or the buffer register, a value f(x) obtained after forward computation; and
subtract, from the value f(x) obtained after forward computation, the first sum input by the adder to obtain an error.

13. The peripheral circuit according to claim 11, wherein the RRAM crossbar array-based neural network training comprises deep spiking learning neural network training, wherein the fourth selector is further configured to, based on the fifth control signal:
read r and;
input read r into the adder;
wherein the adder is further configured to:
read, from the data reading circuit or the buffer register, a value $\gamma \max_a Q'(s', a'; W_B)$ obtained after forward computation;
add up the value $\gamma \max_a Q'(s', a'; W_B)$ obtained after forward computation and r to obtain the first sum; and
input the first sum to the second subtractor, and
wherein the second subtractor is further configured to:
read $Q(s, a; W_A)$ from the data reading circuit or the buffer register; and
subtract, from $Q(s, a; W_A)$, the first sum input by the adder to obtain an error.

14. The peripheral circuit according to claim 6, wherein the data reading circuit further comprises a weight update control circuit configured to:
determine whether a weight is a positive or negative value; and
output a first RESET signal or a second RESET signal based on whether the weight is the positive or the negative value, wherein the weight is represented by a first weight W+ and a second weight W−, wherein both the first weight W+ and the second weight W− are positive values, wherein the first RESET signal is used to indicate that the weight is the positive value, wherein the second RESET signal is used to indicate that the weight is the negative value, wherein the first RESET signal is used to control a corresponding node of the RRAM crossbar array storing the second weight W− to perform a RESET operation, wherein the second RESET signal is used to control a corresponding node of the RRAM crossbar array storing the first weight W+ to perform the RESET operation, and wherein the RESET operation is used to indicate adjustment from low resistance to high resistance.

15. A neural network training system, comprising:
a control circuit configured to generate a plurality of control signals, wherein the plurality of control signals comprise a first control signal and a second control signal;
a resistive random access memory (RRAM) crossbar array; and
a peripheral circuit comprising:
a data preparation circuit configured to:
perform first preprocessing on first data received by the data preparation circuit; and
selectively import preprocessed data obtained by the first preprocessing to a row or column of the RRAM crossbar array based on the first control signal, wherein the first data comprises sample data used for the neural network training;
a data selection circuit configured to:
perform a computation on the preprocessed data in the RRAM crossbar array to obtain second data;
selectively export the second data from the row or column of the RRAM crossbar array based on the second control signal, and
perform second preprocessing on the second data to obtain third data, wherein a correspondence between the first control signal and the second control signal indicates the data preparation circuit importing the preprocessed data obtained by performing the first preprocessing on the first data to the row of the RRAM crossbar array based on the first control signal corresponds to the data selection circuit exporting the second data from the column of the RRAM crossbar array based on the second control signal, and the data preparation circuit importing the preprocessed data obtained by performing the first preprocessing on the first data to the column of the RRAM crossbar array based on the first control signal corresponds to the data selection circuit exporting the second data from the row of the RRAM crossbar array based on the second control signal;
a data reading circuit configured to:
perform a weight update control operation; and
perform a max pooling operation on third data that is received by the data reading circuit to obtain fifth data; and a reverse training computation configured to calculate an error and a derivative of the fifth data.

16. The neural network training system according to claim 15, wherein the peripheral circuit further comprises a storage medium configured to store the sample data and data that is stored into the storage medium by at least one of the data preparation circuit, the data selection circuit, the data reading circuit, or the reverse training computation circuit.

17. The neural network training system according to claim 16, wherein the storage medium comprises:
a sample data storage unit configured to store the sample data; and
a buffer register is configured to store the data stored into the buffer register by at least one of the data preparation circuit, the data selection circuit, the data reading circuit, or the reverse training computation circuit.

18. The neural network training system according to claim 15, wherein the data preparation circuit comprises:
a wordline driver and decoder (WDD) configured to:
receive the first data; and
perform the first preprocessing on the first data to obtain the preprocessed data; and
two first transmission gates (TGs) that are connected in parallel and connected to an output port of the WDD, wherein the two first TGs comprise a first row TG and a first column TG, wherein the first row TG and the first column TG are not switched on at a same time.

19. The neural network training system according to claim 15, wherein the data reading circuit comprises:
a sense amplifier circuit configured to read the third data from a buffer register or the data selection circuit;
a max pooling operation circuit configured to:
perform the max pooling operation on the third data read by the sense amplifier circuit to obtain the fifth data; and
store the fifth data into the buffer register, wherein the fifth data is a value obtained after forward computation.

20. The neural network training system according to claim 19, wherein the max pooling operation circuit further comprises four second registers, wherein a second register of the max pooling operation circuit is configured to read an operand of the max pooling operation to be performed from the buffer register.

* * * * *